(12) United States Patent
Sakamoto

(10) Patent No.: US 6,650,389 B1
(45) Date of Patent: Nov. 18, 2003

(54) LIQUID CRYSTAL DISPLAY DEVICE AND METHOD OF MANUFACTURING THE SAME

(75) Inventor: Michiaki Sakamoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/395,406

(22) Filed: Sep. 14, 1999

(30) Foreign Application Priority Data

Sep. 14, 1998 (JP) .......................................... 10-260043

(51) Int. Cl.[7] ...................... G02F 1/1368; G02F 1/1343
(52) U.S. Cl. ........................ 349/141; 349/43; 349/111; 349/138
(58) Field of Search ................................ 349/141, 139, 349/143, 122, 138, 43, 44, 110, 111; 257/59, 72; 345/92

(56) References Cited

U.S. PATENT DOCUMENTS

| | | | | |
|---|---|---|---|---|
| 5,446,562 A | * | 8/1995 | Sato ............................ | 349/42 |
| 5,641,974 A | * | 6/1997 | den Boer et al. ............. | 257/59 |
| 5,982,460 A | * | 11/1999 | Zhang et al. ................. | 349/39 |
| 6,069,678 A | * | 5/2000 | Sakamoto et al. ........... | 349/141 |

FOREIGN PATENT DOCUMENTS

| | | |
|---|---|---|
| JP | SHO-63-21907 | 5/1988 |
| JP | Hei-6-202127 | 7/1994 |
| JP | Hei-8-286381 | 11/1996 |
| JP | Hei-10-186407 | 7/1998 |

* cited by examiner

*Primary Examiner*—James Dudek
*Assistant Examiner*—Tai Duong
(74) *Attorney, Agent, or Firm*—Scully, Scott, Murphy & Presser

(57) ABSTRACT

In a liquid crystal display (LCD device), according to the present invention, multiple common electrodes (5) are formed above the TFTs substrate, so as to overlap the respective data bus lines (2), which belong to the same column of the TFTs matrix. Whereas multiple common bus lines (3) are formed, so as to overlap both the respective gate bus lines (7, 1), which belong to the same line of the matrix, and the TFTs (6). With this arrangement, unnecessary electric fields coming into the liquid crystal layer (18) can be shut out. The common bus lines (3) and the common electrodes are both formed on or in the inter-layer insulating film (12), towards the side of the said liquid crystal layer (18). Whereas, the data bus lines (2), the said gate bus lines (7, 1), and pixel electrodes (4) are all formed far away from the liquid crystal layer, across the inter-layer insulating film (12).

10 Claims, 21 Drawing Sheets

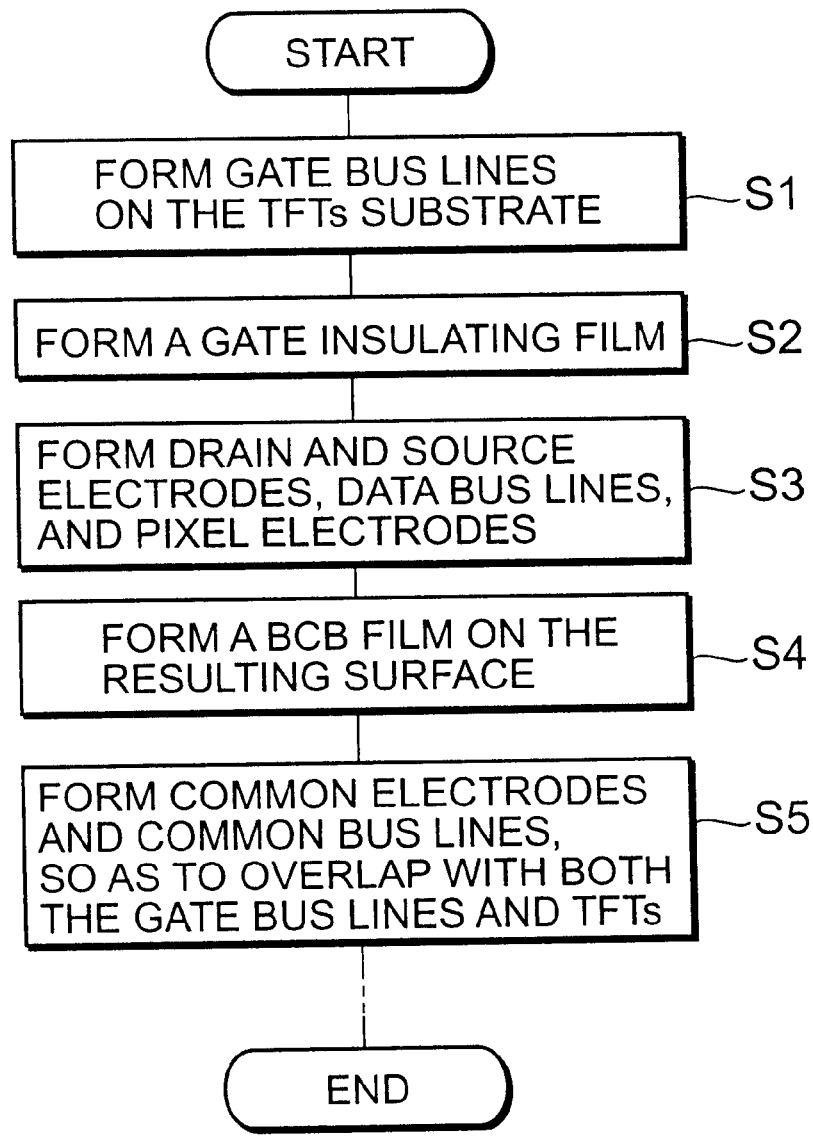

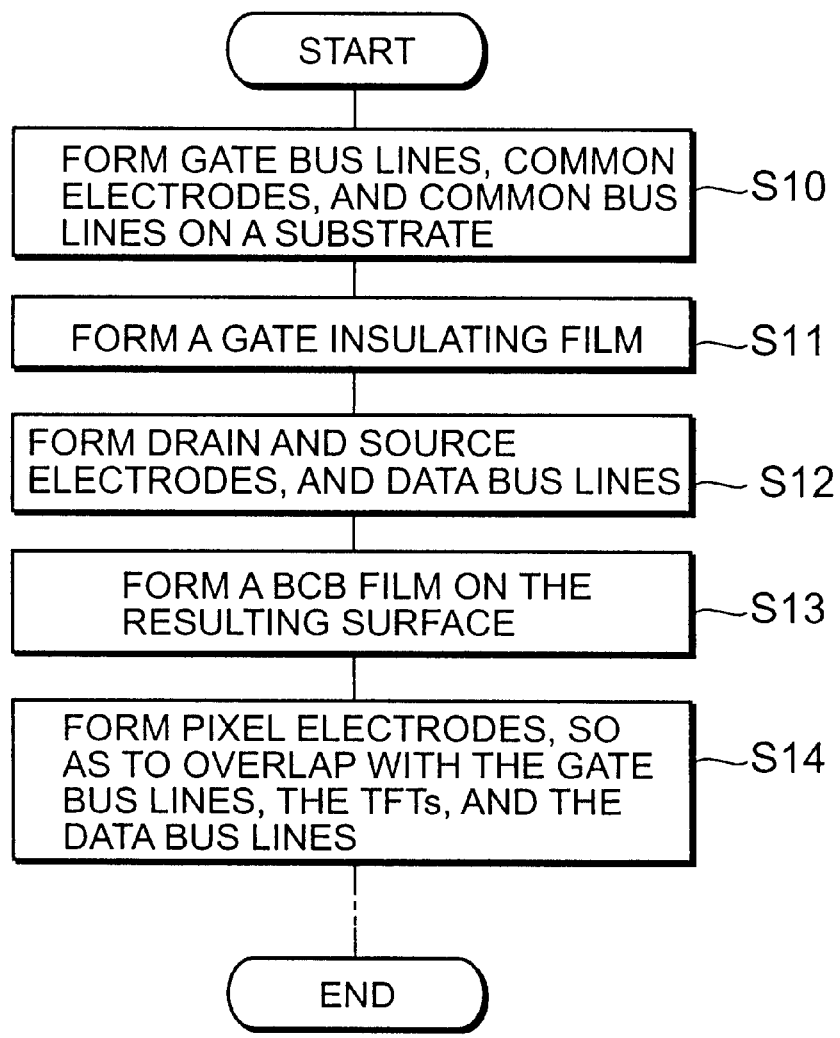

LIQUID CRYSTAL DISPLAY DEVICE AND METHOD OF MANUFACTURING THE SAME

BACKGROUND OF THE INVENTION

1. Field of the Invention

The present invention relates to a LCD (Liquid Crystal Display) device. In particular, an active-matrix-type LCD device that operates in IPS (In-Plane-Switching) mode, so that a wide range of angles of visual field can be provided. The present invention also relates to a method of manufacturing the LCD device.

2. Prior Arts

There are generally two types of LCD devices: one with the TN (Twisted Nematic) mode and the other with IPS mode. Wherein, according to the TN mode, information is displayed through rotating molecule axes of respective oriented LCD device molecules in a direction perpendicular to a glass substrate, whereas, according to the IPS mode, it is done through rotating the molecule axes in a direction parallel to the glass substrate.

An LCD device with the IPS mode has a feature whereby a high quality display is maintained with less dependency upon the viewing angle. This emanates from the fact that even if the eyes of the viewer are moved, they end up looking at only the short axes of the liquid crystal molecule. This special feature results in providing the benefit of a much wider range of angles of visual field than that provided by an LCD device with the TN mode.

A conventional LCD device with the IPS mode providing a wide range of angles of visual field is disclosed in Publication of Examined Patent Application No. Sho-63-21907 and Publication of Unexamined Patent Application No. Hei-6-202127 (hereafter, referred to as Reference 1 and Reference 2, respectively). According to the LCD devices, as shown in these references, since a voltage, irrelevant to the display voltage corresponding to the image signal, is always applied between data bus lines (drain electrode lines), through which an image signal is transmitted, and its corresponding pixel electrode, the applied voltage causes an occurrence of an unnecessary electric field emitted from the data bus line. Wherein, this unnecessary electric field is applied to a liquid crystal layer. As a result, a problem will occur where the image display quality becomes poor.

Accordingly, in order to prevent the data bus line from emitting the unnecessary electric field, and it being applied to the liquid crystal layer, the LCD device, as illustrated in FIGS. 1 to 3 (hereafter, referred to as Reference 3) has been developed. Reference 3 is disclosed in Publication of Unexamined Patent Application No. Hei-10-186407 (Patent Application No. Hei-8-286381). Wherein, the data bus line, through which an image signal is transmitted, is formed above a common bus line that a reference voltage is applied to. In other words, by forming the data bus line so that it covers the entire common bus line, it is possible to shield the liquid crystal layer from the said unnecessary electric field.

FIG. 1 illustrates a partial layout of gate bus lines, data bus lines, a common electrode, and a common bus line in the LCD device as disclosed in Reference 3. FIGS. 2 and 3 are cross-sections along respective straight lines XXI to XXI and XXII to XXII in FIG. 1.

As illustrated in FIGS. 2 and 3, the LCD device is comprised of a glass substrate (hereafter, called TFT substrate) 113 with a matrix of multiple, thin-film transistors (hereafter, called TFT) 106, a glass substrate (hereafter, called CF substrate) 115 with a color filter layer 122, and a liquid crystal layer 118 placed between the substrates 113 and 115. The liquid crystal layer 118 is sealed by a sealing material (not shown in the figures), thus forming liquid crystal cell. This liquid crystal cell is filled with a liquid crystal and spacers.

Gate electrodes 107 of the respective TFT 106 are formed in a matrix on the TFT substrate 113. Multiple gate bus lines (gate electrode lines) 101 are formed so as to be connected electrically with the respective gate electrodes 107. Each of the gate bus lines 101 is connected to multiple gate electrodes 107 placed along each line in the TFT matrix. The multiple gate bus lines 101 are placed parallel to one another, and are also extended in the horizontal direction, as shown in FIG. 1. The gate electrodes 107 and gate bus lines 101 are both covered with a gate insulating film 111, which is formed on the surface of the TFTs substrate 113.

A drain electrode 108 and source electrode 109 corresponding to each gate electrode 107, and a patterned amorphous silicon layer 110 are all formed on the gate insulating film 111. A prospective to-be-generated, conductive channel, which plays the role of electrically connecting the drain electrode 108 and the source electrode 109, is formed inside the amorphous silicon layer 110. The gate electrode 107, its corresponding drain electrode 108 and source electrode 109, and a single amorphous silicon layer 110 comprise a TFT 106.

In addition, as shown in FIG. 2, multiple pixel electrodes 104 and multiple data bus lines 102 are formed on the gate insulating film 111.

As shown in FIG. 1, the multiple data bus lines 102 are parallel to one another extending in a vertical direction. Each data bus line 102 electrically connects the multiple drain electrodes 108 along each column in the TFT matrix, to one another.

Each pixel electrode 104 is placed at pixel region P, which is located between two adjacent gate bus lines 101 or between two adjacent data bus lines 102. It is connected electrically to the source electrode 109 of its corresponding TFT 106. The pixel electrodes 104 are each strip-shaped, each extending parallel to the data bus line 102 within corresponding pixel region P, in the vertical direction.

The TFT 106, the pixel electrode 104, the gate electrode 101, and the data bus line 102 are, as shown in FIGS. 2 and 3, covered with a inter-layer insulating film (passivation film) 112, which is formed on top of the gate insulating film 111.

As illustrated in FIG. 1, multiple common electrodes 105, and multiple common bus lines (common electrode lines) 103 extending in the horizontal direction are both formed on the surface of the inter-layer insulating film 112. Each common electrode 105 is strip-shaped, extending parallel to both the pixel electrode 104 and the data bus line 102 in a vertical direction. Each common bus line 103 connects the multiple common electrodes 105 to one another, and extends parallel to the gate bus line 101 in a horizontal direction.

As clearly shown in FIG. 1, each common electrode 105 is placed above its corresponding data bus line 102, and covers over this entire data bus line 102. Each common bus line 103 is placed in the vicinity of its corresponding gate bus line 101, but does not cover this gate bus line 101.

As shown in FIG. 2, a color filter layer 122 is formed on the surface of the CF substrate 115. The color filter layer 122 is comprised of a color material layer 116 and an over-coating layer 117, which protects the color material layer 116 and smoothes out the surface of the color filter 122. The color material layer 116 is comprised of color dot materials or color stripe materials of red, green, and blue, which are arranged and placed according to a certain regulation, and a black matrix 121, which is placed so as to fill-in among the red, green, and blue dot materials or stripe materials.

A predetermined selecting signal is applied to the gate bus line 101 (see FIG. 4A). thus switching on its corresponding TFT 106. Its corresponding image signal is applied (See FIG. 4B) to the data bus line 102 selected by the said selecting signal. A common reference voltage is applied to the multiple common bus lines 103 at the same time. The TFT 106 corresponding to the pixel selected by the selecting signal, which is applied to the gate bus line 101, turns on. As a result, a voltage corresponding to the image signal applied to the data bus line 102, is applied between its corresponding common electrode 105 and pixel electrode 104. This applied voltage causes the occurrence of an electric field parallel to both the TFTs substrate 113 and the CF substrate 115. Wherein, this electric field is applied to the molecules of the liquid crystal in the liquid crystal layer 118. This electric field allows the molecules of the liquid crystal to rotate by a certain degree of angle in conformity with the applied image signal. Consequently, an image corresponding to the applied image signal is displayed on the screen of the LCD device.

Since each TFT 106 has a so-called bottom gate structure, where the source electrode 109 and the drain electrode 108 are placed above the gate electrode 107, it is generally called a "reverse staggered structure".

According to the LCD device of Reference 3, as is apparent from FIG. 1, each common electrode 105 entirely covers its corresponding data bus line 102. Accordingly, an unnecessary electric field radiated from the data bus line 102, which is a problem with the LCD devices of References 1 and 2, can be virtually blocked by the common electrode 105. Therefore, a possible occurrence of degradation in the image display quality, due to the unnecessary electric field influences on the molecules of the liquid crystal in the liquid crystal layer 118, can be prevented.

However, the LCD device of Reference 3 has the following problem, whereby the quality of the displayed image is not satisfactory.

That is to say, since the color material layer 116 on the CF substrate 115, the black matrix 121. and the over-coating layer 117 remain in an electrically floating state, they tend to be easily polarized or electrically charged (see FIG. 5). In particular, the black matrix 121 tends to be very easily polarized or electrically charged. In addition, the black matrix 121 is conductive, therefore, an electric charge can easily move within it. This may cause the degradation in the quality of a displayed image. For example, the ends of the black matrix 121 may emit a light, or an image may be fixed on the screen of the LCD device. This problem will be described in more detail while referring to FIGS. 4A and 4B, hereafter.

According to the conventional LCD device in FIGS. 1 to 3, as disclosed in Reference 3, a selecting signal is applied to one of the gate bus lines 101. For example, a selecting signal 23 as shown in FIG. 4A, is a typical waveform. In this case, an image signal 24, as shown in FIG. 4B, is applied to the data bus line 102.

The scanning time per frame (Tframe) of the selecting signal 23 in FIG. 4A is equal to 16.6 ms. An ON-voltage Von of approximately 20 V of the selecting signal 23 is applied to one of the gate bus lines 101 within a selecting time Ton (=26 micro-seconds) during the scanning time, Tframe. An OFF-voltage, Voff, of approximately −5 V is applied during the time except for the selecting time (Ton).

As shown in FIG. 5, an unnecessary electric field radiated from the gate bus line 101, while the above negative voltage of −5 V is applied, influences the color material layer 116 of the CF substrate 115, the over-coating layer 117, and the black matrix 121. The electric field causes an occurrence of electrification and polarization in the color material layer 116, the over-coating layer 117, and the black matrix 121.

In particular, the black matrix 121 tends to be easily polarized. In addition, since it includes a material such as carbon, electric charges can easily move within the black matrix 121. This causes a degradation of the image display quality. For example, this causes an occurrence of a smear and/or a fixation of an image on the screen in the conventional LCD devices.

To prevent these problems from occurring, it is necessary to use, for example, a low-conductive and hard-to-be-polarized material for the black matrix 121.

SUMMARY OF THE INVENTION

Accordingly, an objective of the present invention is to provide an active-matrix-type LCD device, which displays an image of high quality.

Another objective of the present invention is to provide an active-matrix-type LCD device, which can control a possible influence caused by the occurrence of an unnecessary electric field, which is generated via an active element such as a TFT.

Furthermore, an objective of the present invention is to provide an active-matrix-type LCD device, which prevents an occurrence of a smear and a fixation of an image on the screen resulting from a possible charging and polarization in the black matrix.

Yet another objective of the present invention is to provide an active-matrix-type LCD device without a black matrix, which tends to easily cause the occurrences of a charging and polarization.

Yet another objective of the present invention is to provide a method of manufacturing the above LCD devices.

To attain the above objectives, according to an aspect of the present invention, an LCD device is provided, comprising a plurality of common electrodes (5), which cover a plurality of data bus lines (2), and a plurality of common bus lines (3), which cover a plurality of gate bus lines. An example of the liquid crystal display device is illustrated in FIG. 9. The above reference numerals put in the parentheses are attached to respective corresponding elements in FIG. 9.

According to an aspect of the present invention, an LCD device is provided, comprising a plurality of pixel electrodes (4), which cover a plurality of gate bus lines (1) and a plurality of data bus lines (2). An example of the liquid crystal display device is illustrated in FIG. 14.

According to an aspect of the present invention, a method of manufacturing an LCD device is provided, comprising a first forming step of forming a plurality of gate bus lines (7, 1) on a substrate; a second forming step of forming a plurality of pixel driving transistors (6), a plurality of pixel electrodes (4), and a plurality of data bus lines (2) on an insulating layer (11), which is formed on the said substrate; a third forming step of forming an inter-layer insulating film (12) on the resulting surface in the said second forming step; and a fourth forming step of forming a plurality of common electrodes (5) on the said inter-layer insulating film (12), so as to overlap both the said plurality of gate bus lines (7, 1)

and pixel driving transistors (6), and also forming a plurality of common bus lines (3) on the said inter-layer insulating film (12), so as to overlap the said plurality of data bus lines (2). An example of a method of manufacturing a liquid crystal display device is illustrated in FIG. 25.

According to an aspect of the present invention, a method of manufacturing an LCD device is provided, comprising a first forming step of forming a plurality of gate bus lines (7, 1), a plurality of common electrodes (5), and a plurality of common bus lines (3) on a substrate; a second forming step of forming a plurality of pixel driving transistors (6) and a plurality of data bus lines (2) on an insulating layer (11), which is formed on the said substrate; a third forming step of forming an inter-layer insulating film (12) on the resulting surface in the said second forming step; and a fourth forming step of forming a plurality of pixel electrodes (4) on the said inter-layer insulating film (12), so as to overlap the said plurality of gate bus lines (7, 1), the said pixel driving transistors (6), and the said data bus lines (2). An example of a method of manufacturing a liquid crystal display device is illustrated in FIG. 26.

BRIEF DESCRIPTION OF DRAWINGS

The above and other objects, features and advantages of the present invention will become apparent in the embodiment section from the following detailed description, when taken in conjunction with the accompanying drawings, wherein:

FIG. 25 is a flowchart showing a method of manufacturing a LCD device, according to the present invention; and FIG. 26 is a flowchart showing a method of manufacturing a LCD device, according to the present invention.

DETAILED DESCRIPTION OF THE PREFERRED EMBODIMENTS

Hereafter, an active-matrix-type LCD device, according to a first embodiment of the present invention, will be described with reference to the figures.

(First embodiment)

Figure 1:
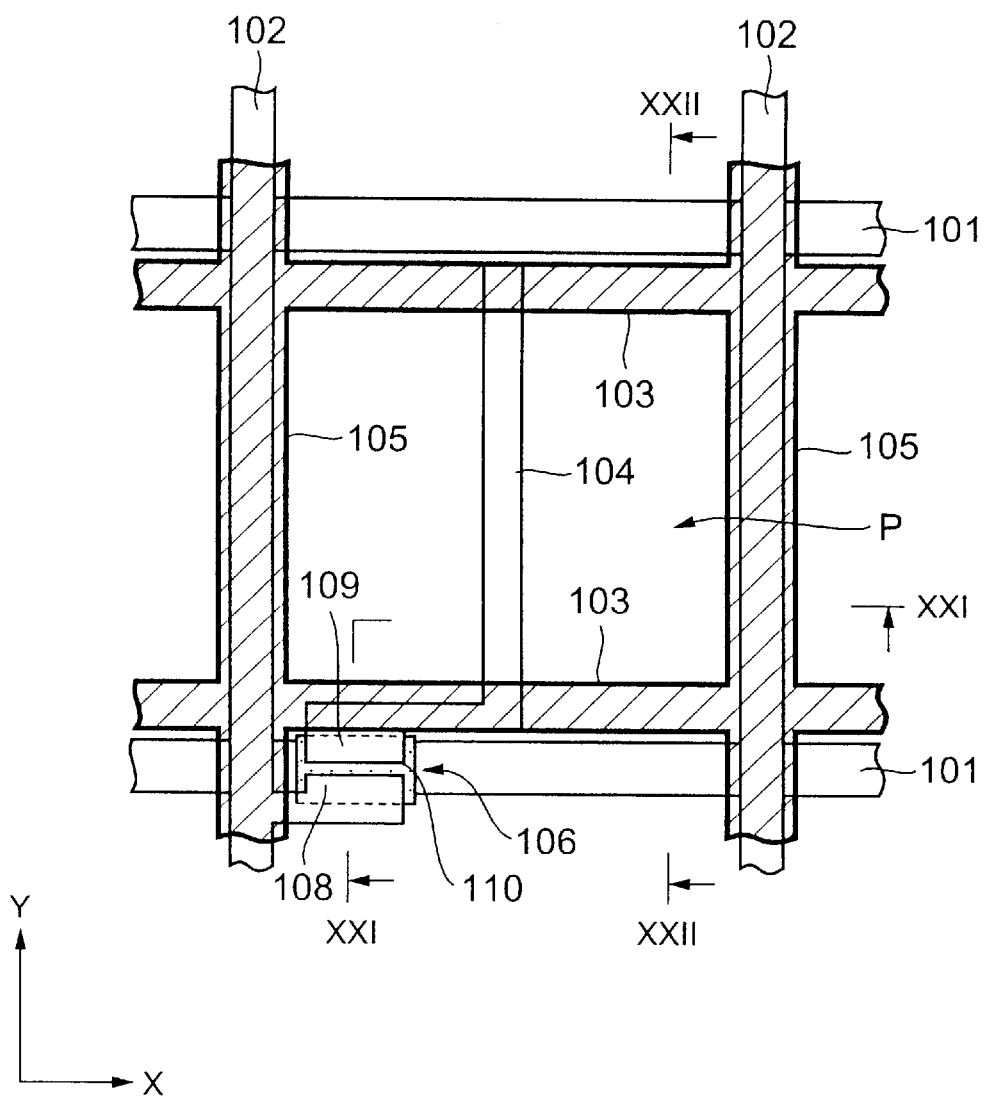
FIG. 1 is an aerial view showing the layout of a TFT, a pixel electrode, gate bus lines, data bus lines, a common electrode, and a common bus line for each pixel of the active-matrix-type LCD device of Reference 3.
Figure 2:
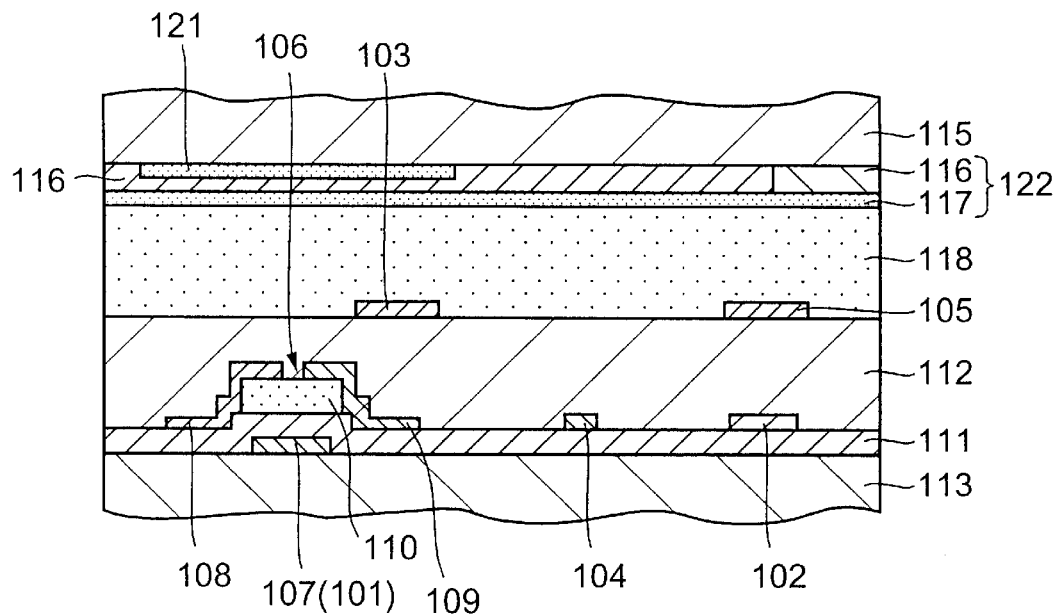
FIG. 2 is a cross section along a straight line XXI to XXI in FIG. 1.
Figure 3:
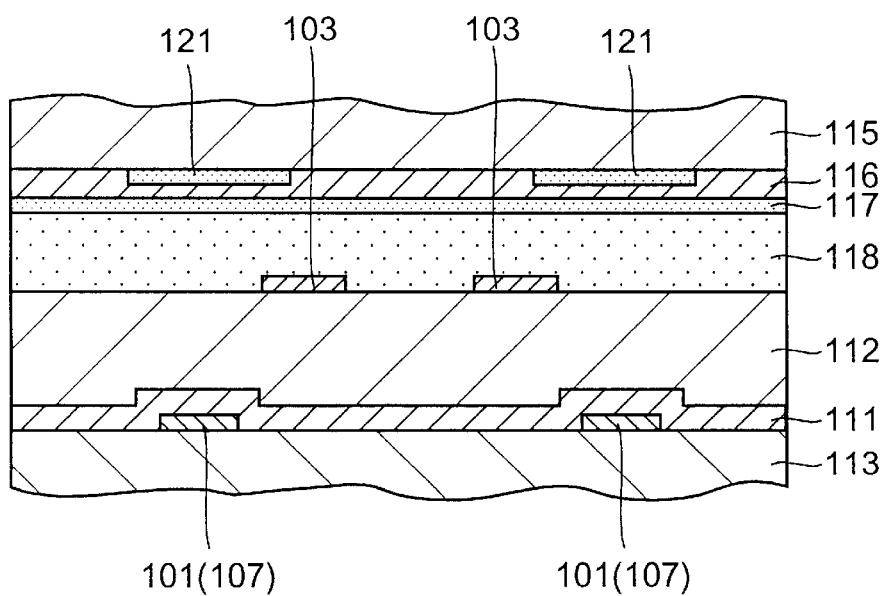
FIG. 3 is a cross section along a straight line XXII to XXII in FIG. 1.
Figure 4A:
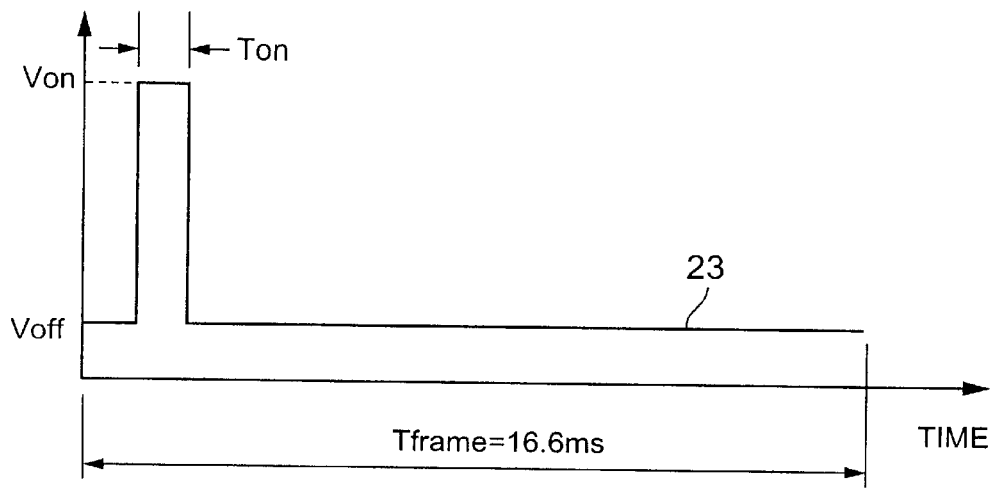
FIGS. 4A and 4B illustrate the waveforms of a selecting signal and an image signal, which are supplied to the active-matrix-type LCD device of Reference 3.
Figure 4B:
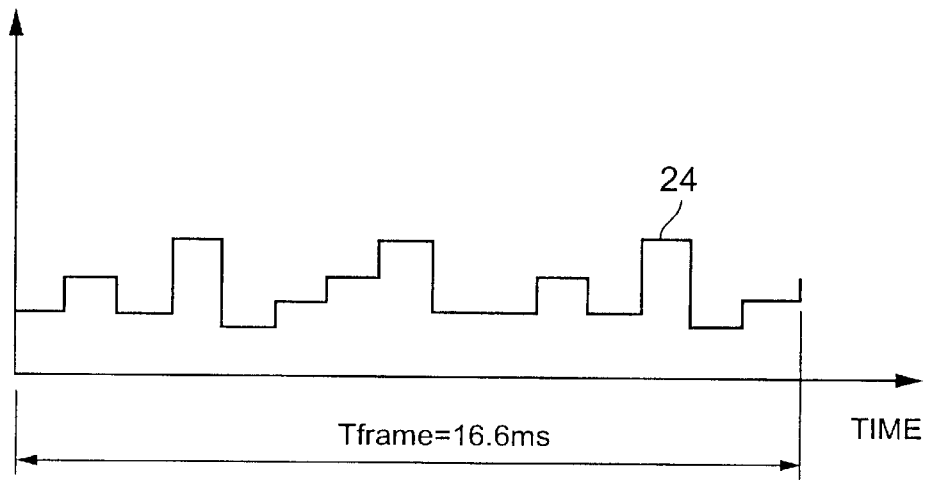
Figure 5:
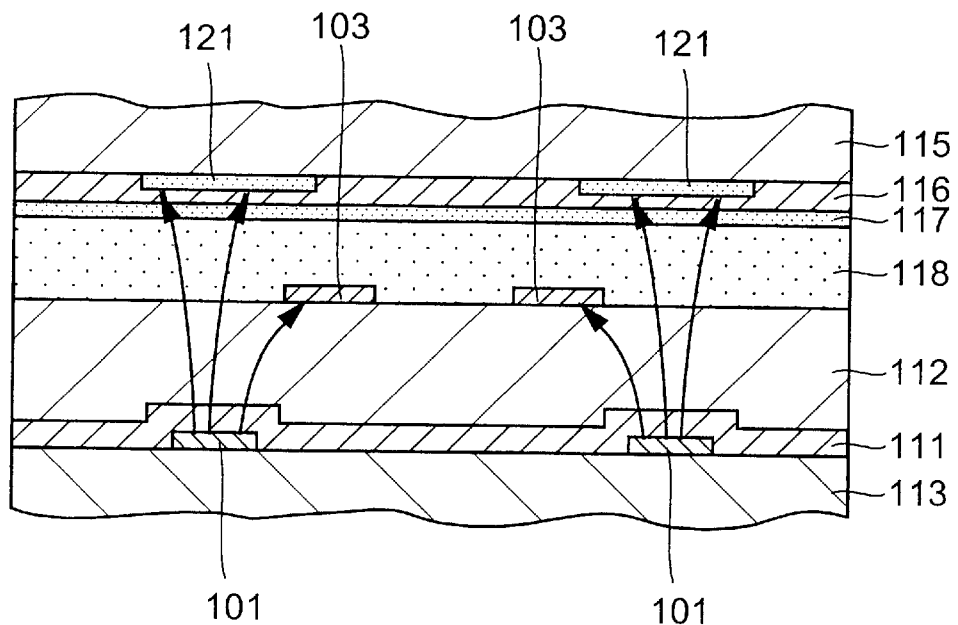
FIG. 5 illustrates the state of an unnecessary electric field generated in the active-matrix-type LCD device of Reference 3.
Figure 6:
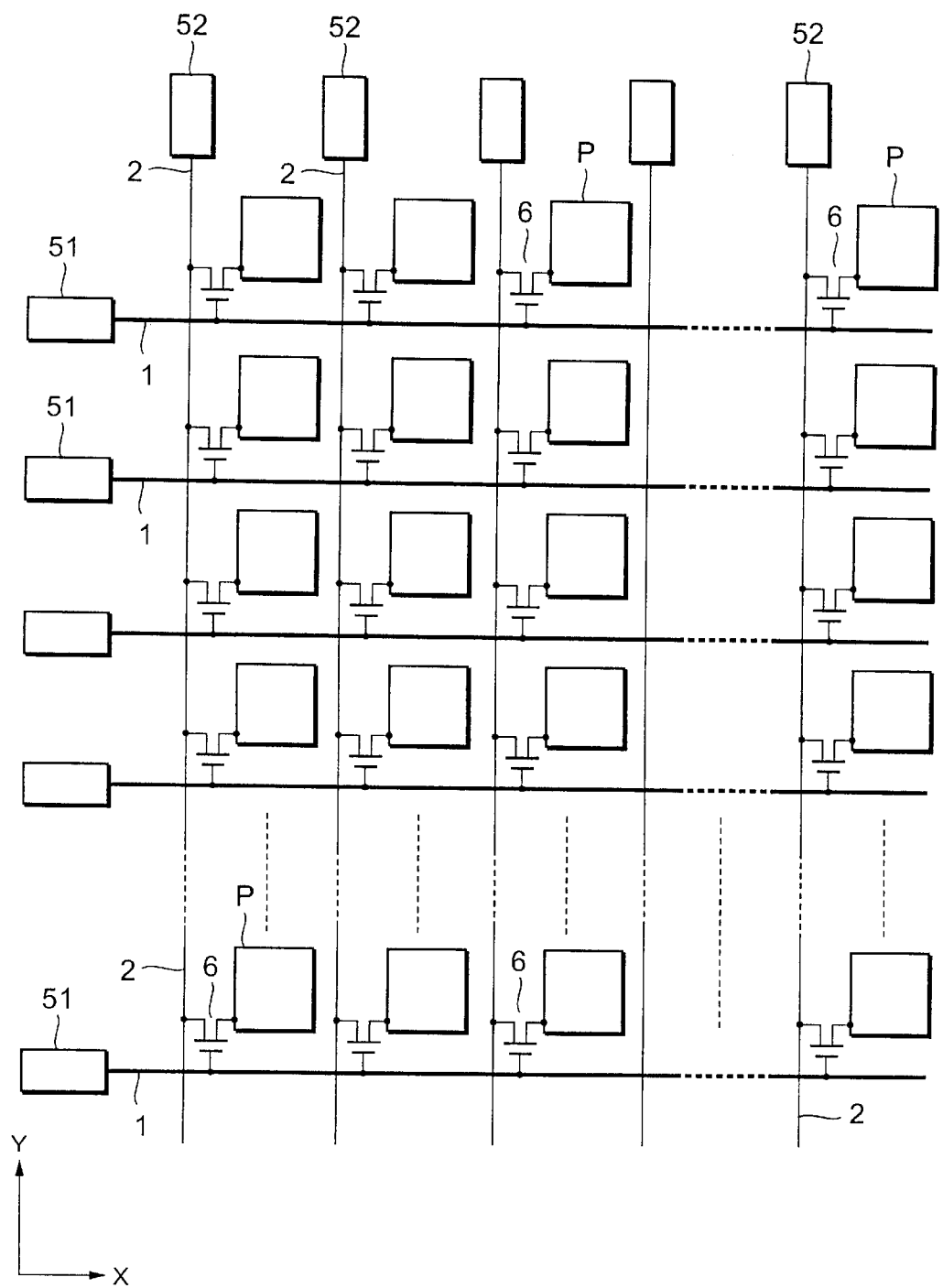
FIG. 6 illustrates the configuration of th e LCD device, according to a first embodiment of the present invention.
Figure 7:
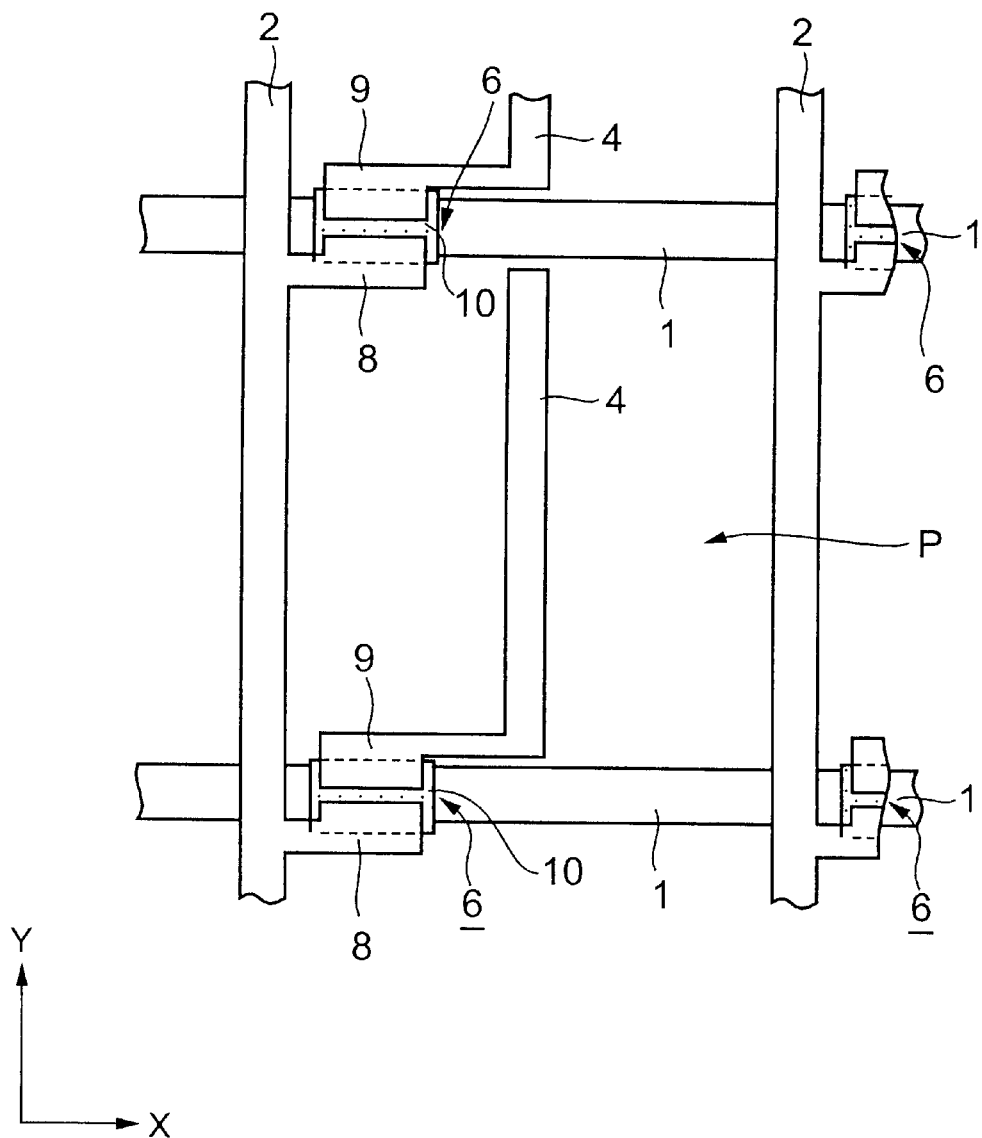
FIG. 7 is an enlargement of part of the structure including adjacent TFTs in FIG. 6, but not including common bus lines and common electrodes.
Figure 8:
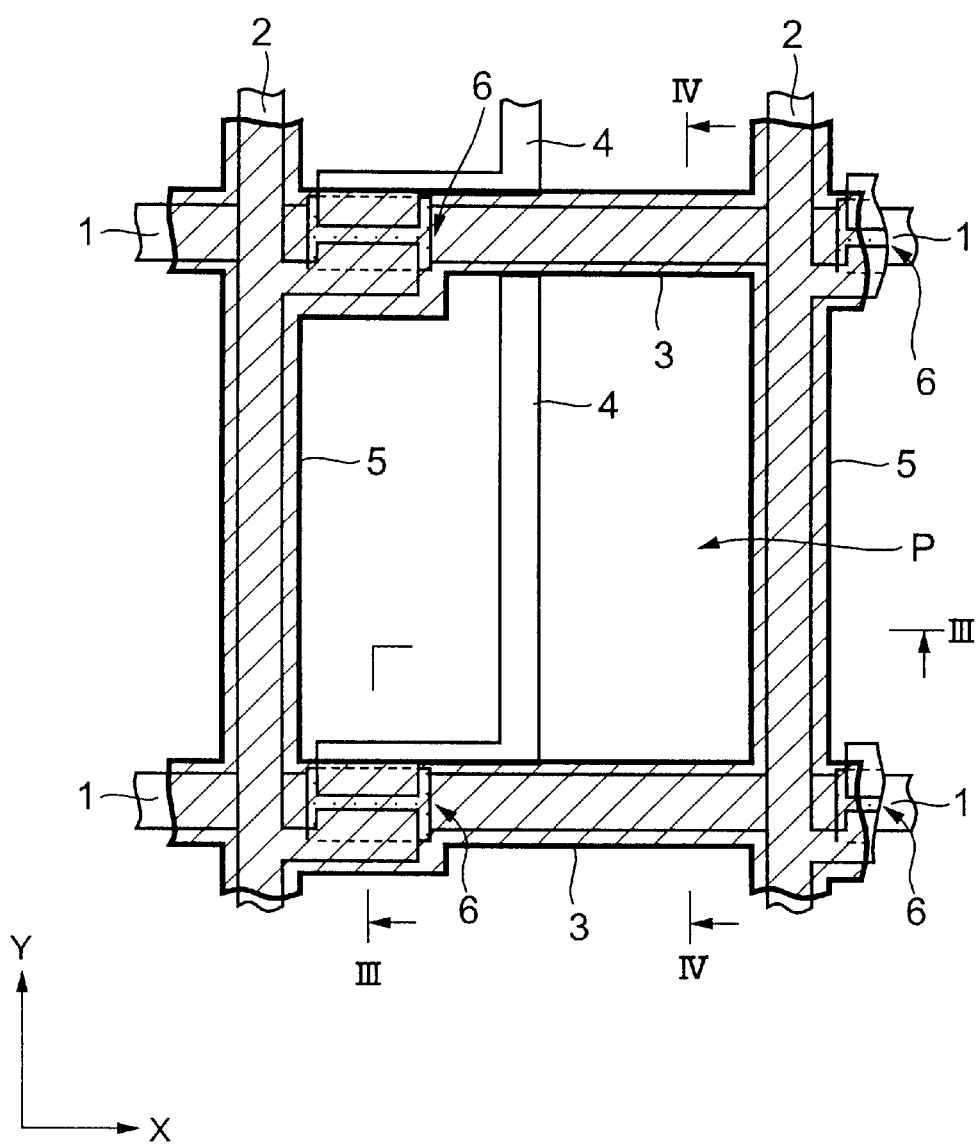
FIG. 8 is an enlargement of the same part of the structure as that of FIG. 7, but further including the common bus lines 3 and the common electrodes 5.
Figure 9:
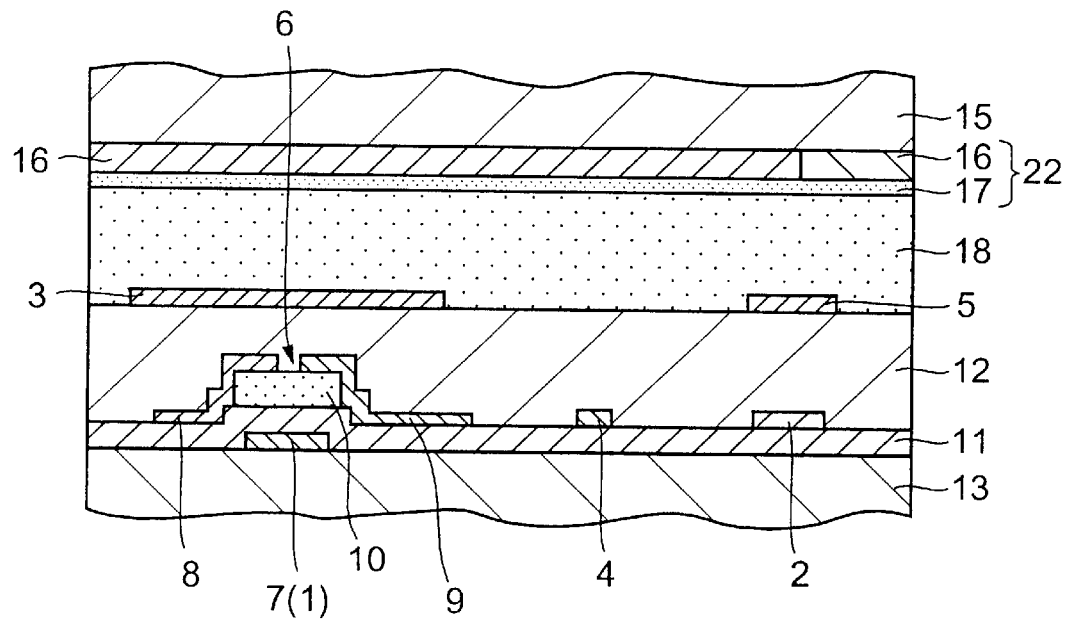
FIG. 9 is a cross section along a straight line III to III in FIG. 8.
Figure 10:
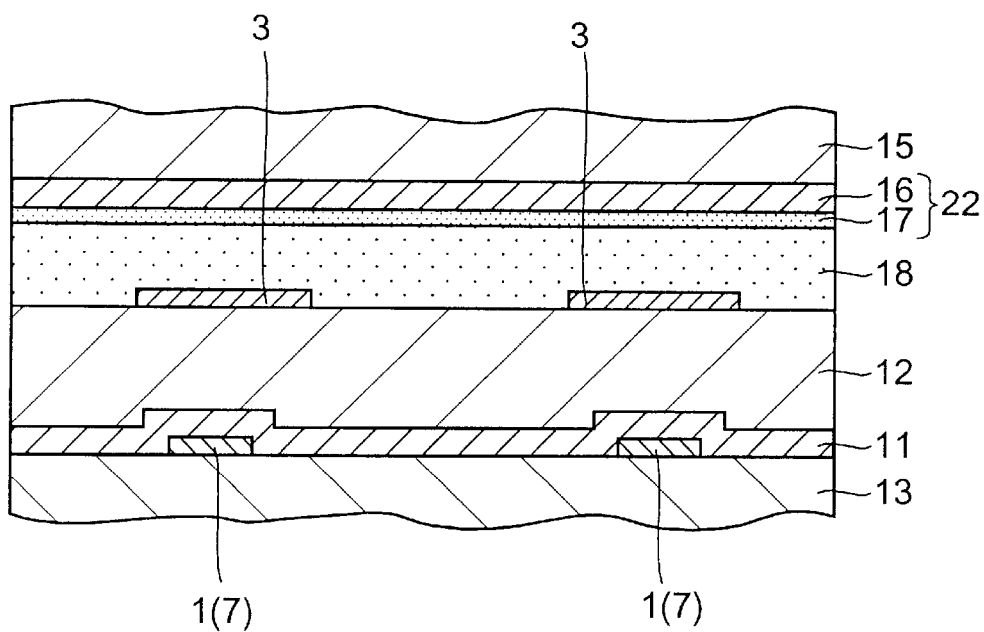
FIG. 10 is a cross section along a straight line IV to IV in FIG. 8.

FIGS. 6 to 10 illustrate an active-matrix-type LCD device, according to the first embodiment of the present invention. According to this LCD device, the molecules of the liquid crystal are controlled in the IPS mode. The relationship among these figures will be described hereafter. FIG. 6 shows the matrix structure of the LCD device, according to the first embodiment of the present invention. FIG. 7 is enlargement of part of the structure including adjacent TFTs in FIG. 6, but not including common bus lines and common electrodes, which are illustrated in FIG. 8. FIG. 8 is enlargement of the same part of the structure as that of FIG. 7, but further including the common bus lines 3 and the common electrodes 5. FIG. 9 is a cross section along a straight line III to III, whereas FIG. 10 is a cross section along a straight line IV to IV.

In FIG. 6, the LCD device is comprised of a matrix of multiple pixel regions P and a matrix of multiple TFTs 6. Multiple gate bus lines 1 extend in the horizontal direction in the matrix, and are placed at equal intervals in the vertical direction. Multiple bus lines 2 extend in the vertical direction in the matrix, and are placed at equal intervals in the horizontal direction. The multiple TFTs 6 are each placed in the vicinity of each point of intersection of its corresponding gate bus line 1 and data bus line 2. Reference numerals 51 depict gate terminals of the respective gate bus lines 1, to which certain voltages are applied, whereas reference numerals 52 depict drain terminals connected to the respective data bus lines 2, also to which certain voltages are applied.

In FIG. 7, it is shown that each TFT 6 is comprised of a drain electrode 8, a source electrode 9, an amorphous silicon layer 10, and a gate electrode 7 (not shown in the Figure, but hidden under the amorphous silicon layer 10 (see FIG. 7)). The source electrode 9 is connected to a pixel electrode 4.

FIG. 8 shows that the data bus lines 2, gate bus lines 1, and TFTs 6 (as also shown in FIG. 7) are all covered with the common bus lines 3 and the common electrodes 5.

In FIGS. 9 and 10, the LCD device is comprised of a TFTs substrate 13, a CF substrates and a liquid crystal layer 18, which is sandwiched between these two substrates 13 and 15. Wherein the TFTs substrate 13 is comprised of a matrix of multiple TFTs 6 (Note: only a TFT 6 is illustrated in the figure), whereas the CF substrate 15 includes a color filter layer 22. A sealing material (not shown in the Figure) seals the circumference of the liquid crystal layer 18, so as to form a liquid crystal cell. A liquid crystal and spacer (not shown in the figure) are both filled in the sealed cell.

A matrix of gate electrodes 7, which belong to the respective TFTs 6, is formed on the TFTs substrate 13. Multiple gate bus lines 1 are placed extending in the horizontal direction of the matrix of TFTs 6. The multiple gate bus lines 1 are formed so as to be parallel to one another extending in the horizontal direction of the matrix of TFTs 6. as shown in FIGS. 7 and 8. Each gate bus line 1 connects the multiple gate electrodes 7, located within the same line of the matrix of TFTs 6, to one another. The gate electrodes 7 and gate bus lines 1 are both covered with a gate insulating film 11. which is formed on the TFTs substrate 13.

Multiple combinations of a pair of drain electrodes 8 and source electrodes 9, and a patterned amorphous silicon layer 10, which all correspond to each gate electrode 7, are formed on top of the gate insulating film 11. A conductive channel will be generated inside the amorphous silicon layer 10, so as to connect electrically the drain electrode 8 to the source electrode 9. Each TFT 6 is made up of its corresponding gate electrode 7, corresponding drain electrode 8, corresponding source electrode 9, and corresponding amorphous silicon layer 10. Each TFT 6 has a "reverse staggered structure", where each source electrode 9 and drain electrode 8 are both formed above their corresponding gate electrode 7.

Multiple pixel electrodes 4 and multiple data bus lines 2 are also both formed on top of the gate insulating film 11.

The multiple data bus lines 2 are formed parallel to one another extending in the vertical direction of the matrix of TFTs 6. Each data bus line 2 connects the multiple drain electrodes 8 located within the same column of the matrix to one another.

Each pixel electrode 4 is formed at an about-square pixel region P, which is located between two adjacent gate bus lines 1 and between two adjacent data bus lines 2 (see FIG. 6). It is also connected to its corresponding source electrode 9 in the TFT 6. As shown in FIG. 7, each pixel electrode 4 is strip-shaped, extending parallel to the data bus lines 2 in the vertical direction within its corresponding pixel region. The ending portions, towards TFTs 6 of each pixel electrode 4, turn to the horizontal direction towards the respective TFTs 6, thereby being connected to the respective drain electrodes 9.

As shown in FIGS. 9 and 10. the TFT 6, the pixel electrode 4, the gate electrode line 1, and the data bus line 2 are all covered with an inter-layer insulating film 12, which is formed on top of the gate insulating film 11. The inter-layer insulating film 12 is formed using a BCB (benzocyclobutene) film.

As shown in FIG. 9, multiple common electrodes 5 extending in the vertical direction, and multiple common bus lines 3 extending in the horizontal direction are both formed on top of the inter-layer insulating film 12. It is noted that, in FIG. 9, only one of the common electrodes 5 and one of the common bus lines 3 are illustrated on account of the fact that the same combinations are formed repeatedly on the film 12. Each common electrode 5 is a strip shape, and parallel to both the pixel electrode 4 and the data bus lines 2. Each common bus line 3 electrically connects the multiple common electrodes 5 extending in the vertical direction, to one another, parallel to the gate bus lines 1.

As is apparent from the arrangement in FIG. 8, each common electrode 5 extending in the vertical direction is overlapped with its corresponding data bus line 2, so as to cover it completely. Each common bus lines 3 extending in the horizontal direction, is overlapped with its corresponding gate bus line 1, so as to completely cover it. With this arrangement, each common bus line 3 plays the role of blocking the electric field generated via the gate bus lines 1, as an electric field blocking film. It also plays the role of a light shutting-out film, from shutting out outside lights, which are emitted towards the TFTs 6. In addition, each common electrode 5 plays the role of blocking the electric field generated via the data bus lines 2, as an electric field blocking film. It also plays the role of a light shutting-out film, from shutting out outside lights, which are emitted towards the TFTs 6.

As shown in FIGS. 9 and 10, a color filter layer 22 is formed on the surface of the CF substrate 15. The color filter layer 22 is comprised of a color material layer 16 and an over-coating layer 17. which protects the color material layer 16 and also smoothes out the surface of the color filter layer 22. The color material layer 16 includes dots or stripes of three primary colored materials (RGB), which are regularly placed. The first embodiment does not use a black matrix, which is often used to fill the spaces among the RGB dots or stripes. Pigments with the three primary colors (RGB) or a resin mixed with a dye is used for the color material.

When a predetermined selecting signal is applied to one of the gate bus lines 1, its corresponding TFT 6 turns on or off, accordingly. Its corresponding image signal is applied to the selected data bus line 2, and a common reference voltage is applied to the multiple common bus lines 3. The TFT 6 in a pixel selected by applying the selecting signal to one of the gate bus lines 1 turns on. As a result, a voltage dependent upon the image signal applied to one of the data bus lines 2, is applied between its corresponding common electrode 5 and pixel electrode 4. This applied voltage causes the generation of an electric field almost parallel to the TFTs substrate and the CF substrate 15; this electric field influences the molecules of the liquid crystal in the liquid crystal layer 18. This generated, electric field allows the molecules of each liquid crystal to rotate by a certain degree of angle, dependent upon the applied image signal. As a result, the image corresponding to the applied image signal is then displayed on the screen of the LCD device.

Next, a method of manufacturing the LCD device, according to the first embodiment of the present invention, will be described while referring to FIGS. 9, 10, and 25.

First, a first conductive layer, made up of Mo, Cr, etc., is formed on the surface of the TFTs substrate 13. The first conductive layer is patterned, so as to form a plurality of gate bus lines 1, which extend in the horizontal direction (Step 1 in FIG. 25). The gate bus lines 1 perform the role of gate electrodes 7 in the respective TFTs 6.

Secondly, an insulating film made of a material such as SiN is formed so as to cover both the gate bus line 1 and the gate electrode 7 (Step 2 in FIG. 25). An amorphous silicon layer is then formed on the resulting surface. The two consecutively formed films comprise a gate insulating film 11. Thereafter, a second conductive layer such as Mo or Cr is formed on the amorphous silicon layer. The second conductive layer is then patterned; so as to form both drain electrodes 8 and source electrodes 9 of the respective TFTs 6. In addition. data bus lines 2 and pixel electrodes 4 are then formed (Step 3 in FIG. 25). Each drain electrode 8 is connected to its corresponding data bus line 2, whereas each source electrode 9 is connected to its corresponding pixel electrode 4.

Thereafter, a BCB film or an inter-layer insulating film 12 is formed, so as to cover both the drain electrodes 8 and the source electrodes 9 (Step 4 in FIG. 25). The thickness of the inter-layer insulating film 12 ranges from 0.5 to 1 microns.

A third conductive layer made of a material such as Mo or Cr is formed next on the passivation film 12. This formed layer is then patterned, so as to form common electrodes 5 and common bus lines 3, which are connected to one another. Wherein, each common bus line 3 is formed, so as to overlap completely its corresponding gate bus line 1 and gate electrode 7, whereas each common electrode 5 is formed, so as to overlap completely its corresponding data bus line 2 (Step 5 in FIG. 25).

As is described above, according to the liquid crystal display device of the first embodiment, a plurality of common electrodes 5 are formed above the TFTs substrate 13; so as to overlap with the respective data bus lines 2 connected to the TFTs 6, which are involved in the same column of the matrix. In addition, a plurality of common bus lines 3 are also formed, so as to overlap with the respective gate electrodes 7 belonging to the same line of the matrix, and corresponding gate bus lines 1. The common electrodes 5 play a role of shutting out an unnecessary electric field, which is radiated from the data bus lines 2 towards the liquid crystal layer 18. In addition, the common bus lines 3 performs the role of shutting out the unnecessary electric field, which is radiated from the gate bus lines 1 towards the liquid crystal layer 18. That is to say, not only the unnecessary electric field radiated from the data bus lines 2 towards the liquid crystal layer 18, as described in Reference 3, but also the unnecessary electric field radiated from the gate bus lines 1 towards the liquid crystal layer 18 is shut out. As a result, the CF substrate (15) side of the over coating layer 17, the color material layer 16 etc. cannot be electrically charged up.

Therefore, a bad influence resulting from the occurrence of an unnecessary electric field, radiated from the TFTs substrate 13, can be decreased more greatly. For example, an occurrence of a smear and a fixation of an image caused by the black matrix, which tends to cause an occurrence of electrification and polarization, can be prevented. As a result, the LCD device, according to the first embodiment of the present invention, displays an improved quality of image, which is more superior to that of the LCD device as shown in Reference 3.

Moreover, a great range of changing the structure, such as placing an additional, electric field blocking layer or related layers is unnecessary for its improvement. Also, a possible increase in the necessary number of manufacturing process steps is not required.

Furthermore, according to the LCD device of the first embodiment of the present invention, the common bus lines 3 cover the respective TFTs 6, so that they can perform the role of shutting out possible incoming, outside lights, which may hit the TFTs 6. Therefore, not only a bad influence resulting from outside lights coming to the TFTs 6 can be removed, but also the black matrix can be omitted from the color filter layer 22. As a result, the absence of a black matrix in the color filter layer 22 is advantageous in that the structure of the color filter layer 22 and its fabrication method can both be simplified.

Figure 11:
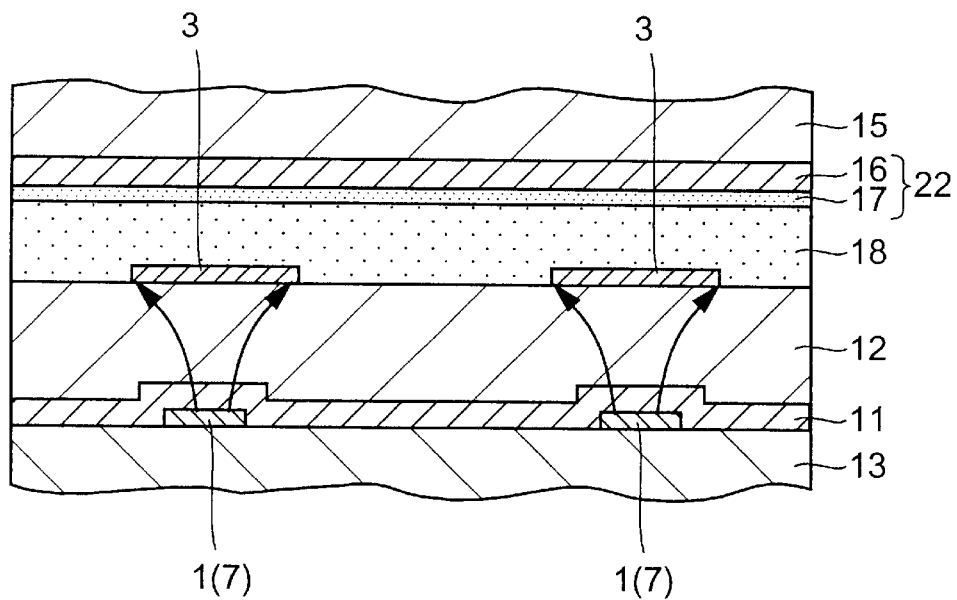
FIG. 11 illustrates a state of an electric field generated in the LCD device, according to the first embodiment of the present invention.

The reason why the LCD device, according to the first embodiment of the present invention, can display an improved quality of image, will be described in more detail hereafter, while referring to FIG. 11. FIG. 11 illustrates the state of an electric field generated in the LCD device. As is apparent from FIG. 11, the common bus lines 3 shut out unnecessary electric fields radiated from the gate bus line 1 and gate electrode 7. As a result, almost no electric field can reach the liquid crystal layer 18. Thereby, an occurrence of electrification and polarization in the color material layer 16 and the over-coating layer 17 are both controlled. Consequently, a possible degradation in the quality of displaying an image cannot occur in the LCD device, according to the present invention.

In summary, according to the LCD device of the first embodiment, in order to shut out unnecessary electric fields coming to the liquid crystal layer (18), multiple common electrodes (5) are formed above the TFTs substrate; so as to overlap with the respective data bus lines (2) which belong to the same column of the TFTs matrix. Whereas multiple common bus lines (3) are formed, so as to overlap the respective gate bus lines (7, 1), which belong to the same line of the matrix, as shown in FIG. 9.

It is preferable that the LCD device of the first embodiment comprises of the said common electrodes (5), and that common bus lines (3) are both formed on or in the inter-layer insulating film (12), towards the side of the said liquid crystal layer (18). Whereas, the said data bus lines (2), the said gate bus lines (7, 1), and pixel electrodes (4) are all formed far away from the liquid crystal layer across the inter-layer insulating film (12).

Furthermore, it is preferable that the said inter-layer insulating film (12) is made of an organic film with a low dielectric constant and low possibility of an occurrence of polarization.

Furthermore, the said inter-layer insulating film can be made up of several layers such as an inorganic film and an organic film with a low dielectric constant and low possibility of an occurrence of polarization. It is noted that the "low dielectric constant" denotes a value ranging from approximately 2.0 to 3.5, whereas the above "low possibility of an occurrence of polarization" means that the polarizability of the organic film is lower than those of the color filter and black matrix.

Furthermore, it is preferable to use a BCB film for the organic film making up the inter-layer insulating film. This emanates from the fact that its dielectric constant is low, namely, equal to 2.7. In addition, its hygroscopicity and polarizability are both low.

Furthermore, polysiloxane or a variety of SOG (Spin-On-Glass) materials can be alternatively used for the organic film.

Furthermore, according to the first embodiment, it is preferable that the areas of the inter-layer insulating film corresponding to the pixel regions on the TFTs substrate are removed. Thereby, the electric fields used for displaying an image can influence the molecules of the liquid crystal layer more effectively.

Furthermore, according to the LCD device of the first embodiment, it is preferable that the said common electrodes cover respective TFTs. Wherein, the said common electrode plays a role, as a light blocking film, in shutting out outer lights from coming to the TFTs. Thereby, no black matrix is necessary in the color filter layer. As a result, the structure of the color filter layer and its manufacturing method can be simpler.

(Second embodiment)

Figure 12:
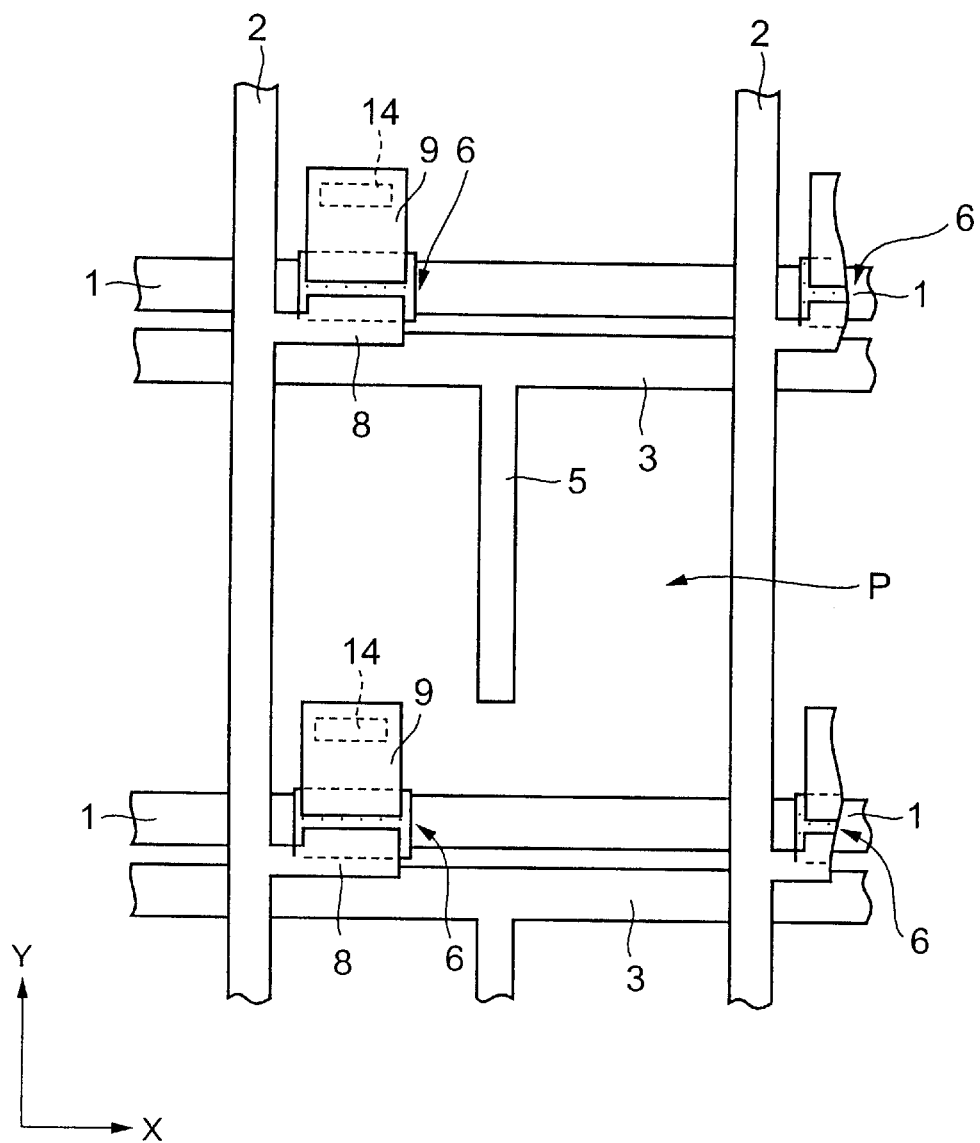
FIG. 12 illustrates the configuration of part of an active-matrix-type LCD device, according to a second embodiment of the present invention, before pixel electrodes 4 are formed.
Figure 13:
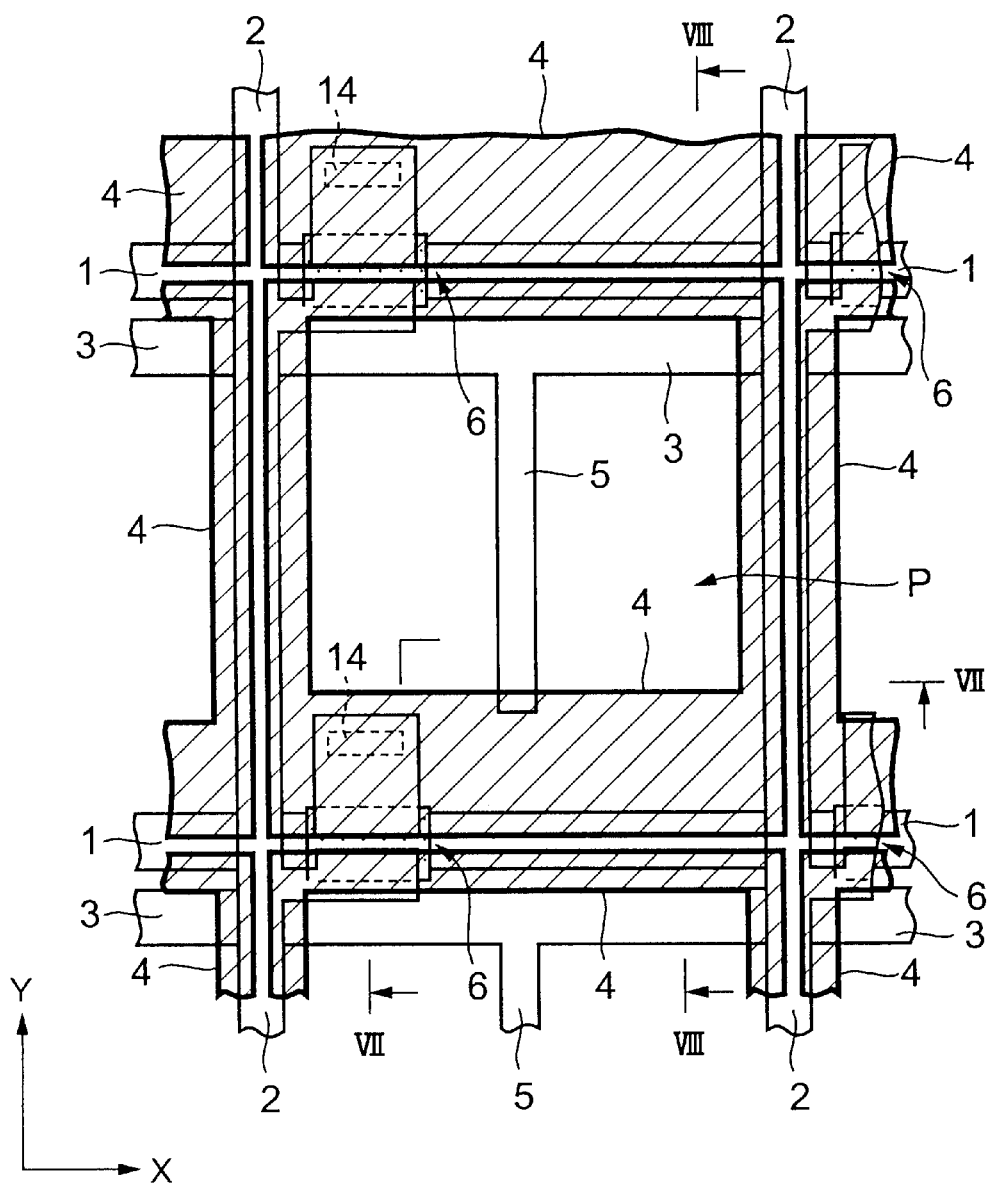
FIG. 13 illustrates the configuration of the same part as in FIG. 12, once the pixel electrodes 4 are formed.
Figure 14:
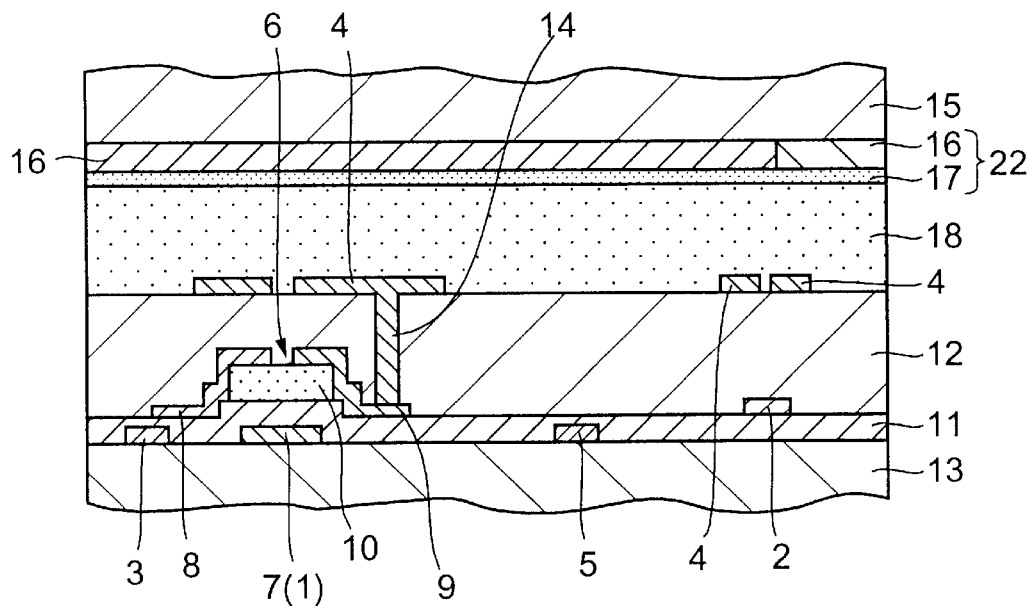
FIG. 14 is a cross section along a straight line VII to VII in FIG. 13.

Next, an active-matrix-type LCD device, according to a second embodiment of the present invention, will be described with reference to FIGS. 12 to 15. In this display, the molecules of the liquid crystal are controlled in the IPS mode. FIG. 12 illustrates part of the structure including adjacent TFTs in FIG. 6, according to the second embodiment of the present invention, but not including pixel electrodes 4 (which are illustrated in FIG. 13). In other words, FIG. 12 shows the structure before the pixel electrodes 4 are fabricated. FIG. 13 illustrates the same part of the structure as that in FIG. 12, but further including the pixel electrodes 4. FIG. 14 is a cross section along a straight line VII to VII, whereas FIG. 15 is a cross section along a straight line VIII to VIII.

As shown in FIG. 12, gate bus lines 1 and common bus lines 3 extend both in the x direction, whereas data bus lines 2 extend in the Y direction. Each common bus line 3 is connected to a common electrode 5.

In FIG. 13, a plurality of pixel electrodes 4 are formed over the gate bus lines 1, the data bus lines 2, and the TFTs 6.

Figure 15:
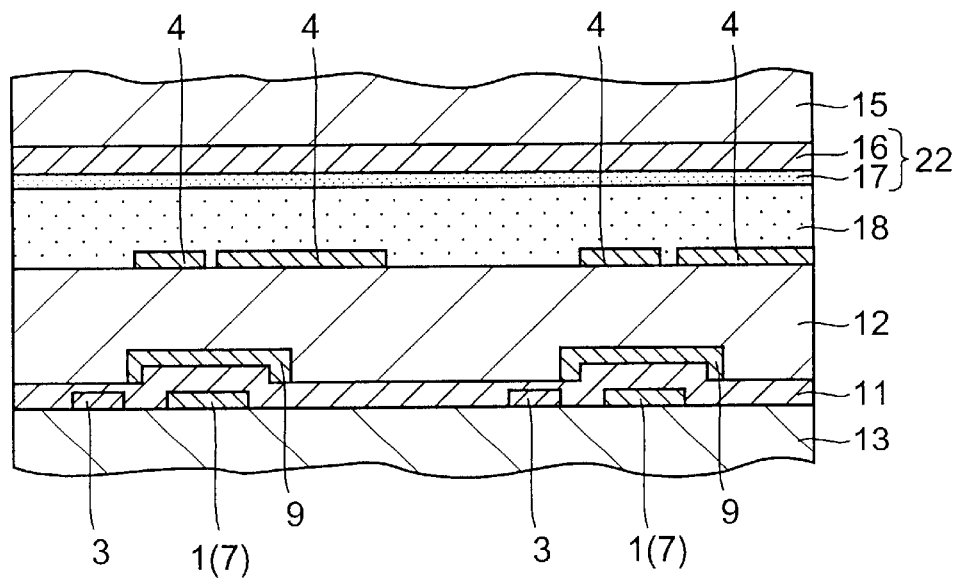
FIG. 15 is a cross section along a straight line VIII to VIII in FIG. 13.

In FIGS. 14 and 15, the LCD device, according to the second embodiment, is comprised of a TFTs substrate 13, a CF substrate 15, and a liquid crystal layer 18, which is placed between the two substrates 13 and 15. Wherein, a matrix of TFTs 6 are formed on the TFTs substrate 13, whereas a color filter layer 22 is formed on the CF substrate 15. The liquid crystal layer 18 is sealed with a sealing material (not shown in the figures), so as to form its cell. Wherein, a liquid crystal and spacer are both filled in the cell.

The basic structure of the second embodiment as described above is the same as that of the first embodiment.

A matrix of gate electrodes 7 in the respective TFTs 6 is formed on top of the TFTs substrate 13, whereas a plurality of gate bus lines 1 are formed; so as to extend in the line direction (X direction) of the matrix, in the same manner as that of the first embodiment. Each gate bus line 1 is connected to a group of gate electrodes 7 in the TFTs 6, which belong to the same line in the matrix. In this point, the arrangement of the second embodiment is the same as that of the first embodiment. In addition, a plurality of common electrodes 5 and common bus lines 3 in the second embodiment are also formed on top of the TFTs substrate 13.

Each common electrode 5 is formed at the same location within its corresponding pixel region P as that of each pixel electrode 4 in the first embodiment. It also is almost the same size as that of each strip-shaped pixel electrode 4 in the first embodiment. Each common bus line 3 extends in the line direction (X direction) of the matrix of TFTs 6, thus electrically connecting a group of common electrodes 5, which belong to the same line of the matrix, to one another.

The gate electrodes 7, gate bus lines 1, common electrodes 5, and common bus lines 3 are all covered with a gate insulating film 11, formed on top of the TFTs substrate 13.

A pair of drain electrode 8 and source electrode 9, which correspond to each gate electrode 7, and a patterned amorphous silicon layer 10 are all formed on top of the gate insulating film 11. One of the gate electrodes 7, its corresponding drain electrode 8 and source electrode 9, and its corresponding amorphous silicon layer 10 comprise each TFT 6. Each TFT 6 has a so-called "reverse staggered structure", where each source and drain electrode is formed above their gate electrode. In this respect, the structure of the TFTs in the second embodiment is the same as those of the first embodiment.

A plurality of data bus lines 2 are formed on top of the gate insulating film 11. Unlike the first embodiment, the common electrodes 5 and the gate bus lines 1, in the second embodiment, are all formed under the gate insulating film 11, in other words, on top of the TFTs substrate 13, but not on top of the gate insulating film 11.

The data bus lines 2 are parallel to one another, extending in the column direction (Y direction) of the matrix of TFTs 6. Each data bus line 2 electrically connects a group of drain electrodes 8, which belong to the same column of the matrix of TFTs 6.

As shown in FIGS. 14 and 15, the TFTs 6 and the data bus lines 2 are covered with an inter-layer insulating film 12 which is formed on top of the gate insulating film 11. The inter-layer insulating film 12 is made of BCB film.

As shown in FIG. 13, a plurality of pixel electrodes 4 are formed on top of the inter-layer insulating film 12. Each pixel electrode 4 is formed along the outer area of each about-square-shaped pixel region P, which is surrounded with the following: adjacent two gate bus lines 1 and adjacent two data bus lines 2. Each pixel electrode 4, as shown in FIG. 14, is connected electrically to its corresponding source electrode 9 in the TFT 6, via a contact hole 14 in the inter-layer insulating film 12. The shape of each pixel electrode 4 is square with four sides, each extending along the outer area of a pixel region P. Wherein, two sides are parallel to the gate bus lines 1, whereas the other two sides are parallel to the data bus lines 2.

As shown in FIG. 13, the side area of each pixel electrode 4 extending in the X direction or the line direction is overlapped with half the area of one of the two gate bus lines 1, which are located at the respective, horizontal sides of a pixel region P. Whereas, the side area of each pixel electrode 4 extending in the Y direction or the column direction is overlapped with half the area of one of the two data bus lines 2, which are located at the respective, vertical sides of the pixel region P. As a result, the pixel electrodes 4 cover almost the entire areas of both the gate bus lines 1 and the data bus lines 2.

There are gaps between adjacent pixel electrodes 4 extending in the X direction and gaps between adjacent pixel electrodes 4 extending in the Y direction.

Since the structure of the CF substrate 15 of the second embodiment is the same as that of the first embodiment, its explanation will be omitted. Furthermore, since the method of applying a selecting signal to each gate bus line 1, and an image signal to each data bus line 2, in the second embodiment, is also the same as that of the first embodiment, its explanation will also be omitted.

Next, a method of manufacturing the LCD device with the above arrangement, according to the second embodiment of the present invention, will be described while referencing FIG. 26.

First, a first conductive layer made of a material such as Mo or Cr is formed on top of the TFTs substrate 13. The first conductive layer is patterned next, so as to form: a plurality of gate bus lines 1 extending in the X direction; a plurality of common electrodes 5 placed within each pixel region P; and a plurality of common bus lines 3 extending in the X direction (Step 10). Wherein, the common bus lines 3 electrically connect the common electrodes 5 to one another. The gate bus lines 1 also play the role of gate electrodes 7 of the respective TFTs 6.

Secondly, an insulating film made of a material such as SiN is formed, so as to cover the gate bus lines 1, the gate electrodes 7, the common electrodes 5, and the common bus lines 3 (Step 11). An amorphous silicon layer is then formed on the resulting surface. As a result, a gate insulating film 11 is formed. Thereafter, a second conductive layer made of a material such as Mo or Cr is formed on top of the amorphous silicon layer. The second conductive layer is then patterned, so as to form drain electrodes 8 and source electrodes 9 for the respective TFT 6, and data bus lines 2 (Step 12). Each drain electrode 8 is connected electrically to its corresponding data bus line 2, whereas each source electrode 9 is connected electrically to its corresponding pixel electrode 4.

Thereafter, an inter-layer insulating film 12 is formed, so as to cover the drain electrodes 8 and source electrodes 9, and the data bus lines 2 (Step 13). The inter-layer insulating film 12 is the same as that of the first embodiment. A contact hole 14 is then formed right above each drain electrode 9 of its corresponding TFT 6.

Subsequently, a third conductive layer is formed on the inter-layer insulating film 12. The third conductive layer is then patterned, so as to form a plurality of pixel electrodes 4. Each pixel electrode 4 is connected electrically to its corresponding drain electrode 9, via its corresponding contact hole 14 on the inter-layer insulating film 12. The pixel electrodes 4 cover almost the entire areas of both the gate bus lines 1 and the data bus lines 2 as well as the TFTs 6 (Step 14). Thereby, an electric field radiated from each gate bus line 1 is blocked, whereas an outer light possibly coming to each TFT 6 is blocked.

As described above, in the LCD device, according to the second embodiment of the present invention, a plurality of pixel electrodes 4 are formed in such a manner that they overlap both the respective data bus lines 2, which belong to the same column in the matrix of TFTs 6, and the respective gate bus lines 1, which belong to the same line in the matrix of TFTs 6.

The pixel electrodes 4 play a role in shutting out both the unnecessary electric fields radiated from the respective data bus lines 2 towards the liquid crystal layer 18, and the unnecessary electric fields radiated from the respective gate bus lines 1 towards the liquid crystal layer 18.

As a result, the unnecessary electric fields radiated from the TFTs substrate 13 cannot adversely affect the quality of an image displayed on the screen. For example, an occurrence of a smear or a fixation of an image caused by the black matrix, which tends to cause an occurrence of electrification and polarization, can be prevented. As a result, the LCD device, according to the second embodiment of the present invention, displays an improved quality of image, which is superior to that of the LCD device as shown in Reference 3.

Moreover, a large number of modifications in the structure, such as placing an additional, electric field blocking layer or related layers, are unnecessary for its improvement. Also, a possible increase in the necessary number of manufacturing process steps is not required.

Furthermore, according to the LCD device, of the second embodiment of the present invention, the pixel electrodes 4 cover the respective TFTs 6, so that they can play a role of shutting out possible incoming, outside light that may hit the TFTs 6. Thereby, not only can the bad influence resulting from outside lights coming to the TFTs 6 be removed, but the black matrix can be omitted from the color filter layer 22. As a result, no black matrix in the color filter layer 22 is advantageous in that the structure of the color filter layer 22 and its fabrication method can both be simplified.

(Third embodiment)

Figure 16:
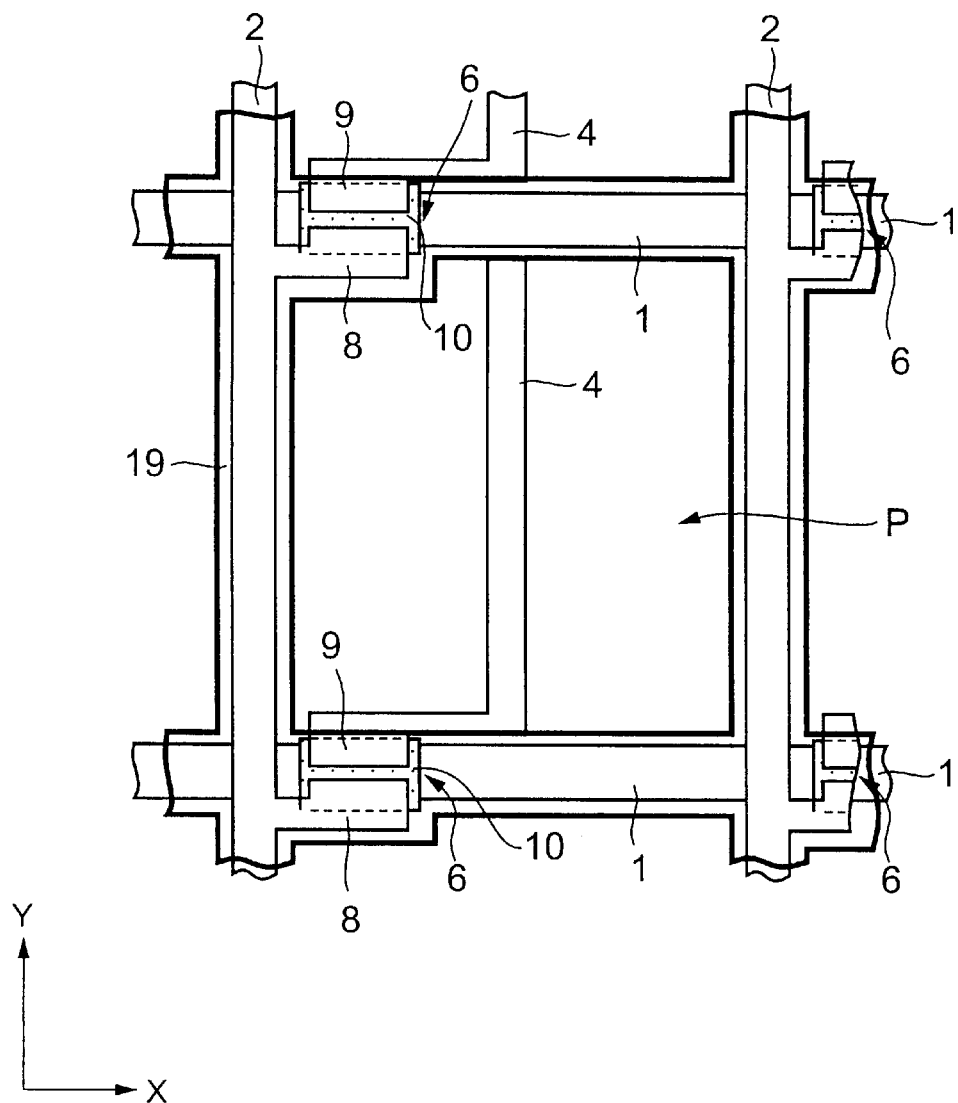
FIG. 16 illustrates the configuration of part of an active-matrix-type LCD device, according to the third embodiment of the present invention, before common bus lines 3 and common electrodes 5 are formed.
Figure 17:
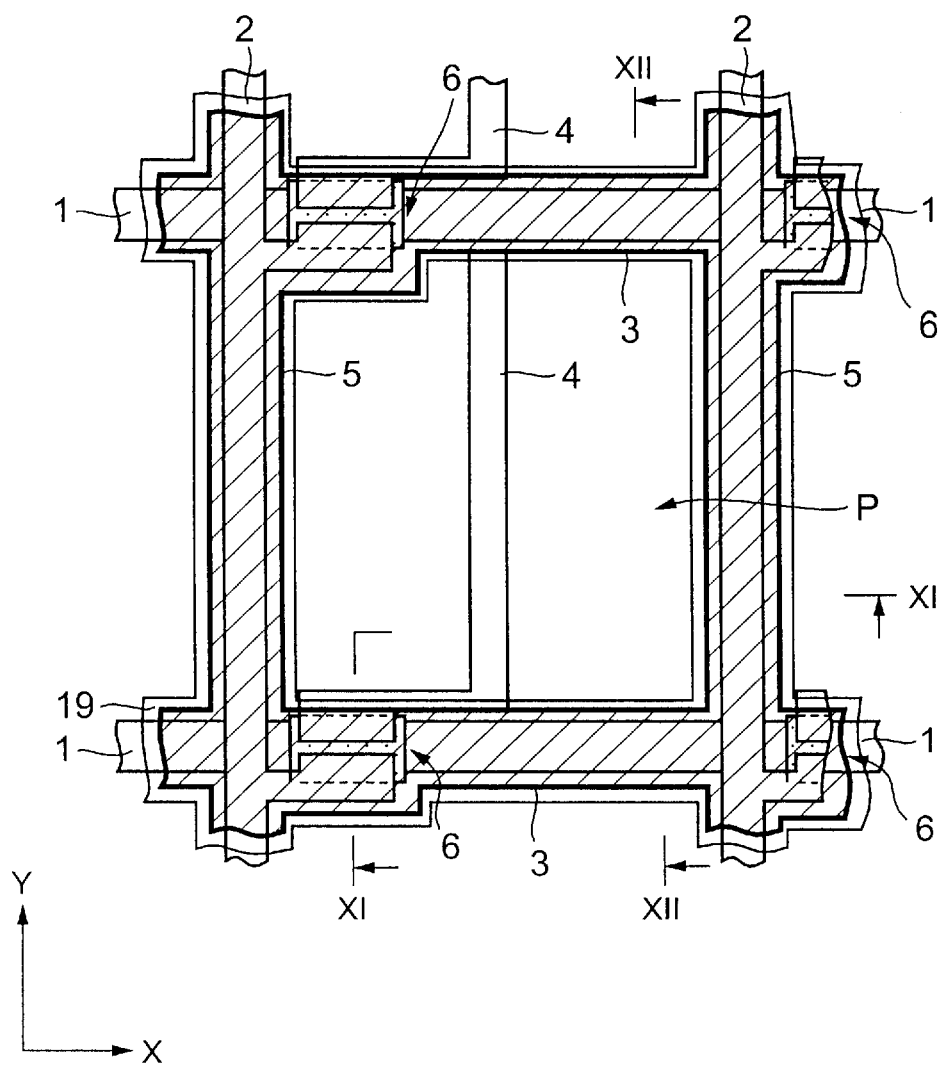
FIG. 17 illustrates the configuration of the same part as in FIG. 16, once the common bus lines 3 and common electrodes 5 are formed.
Figure 18:
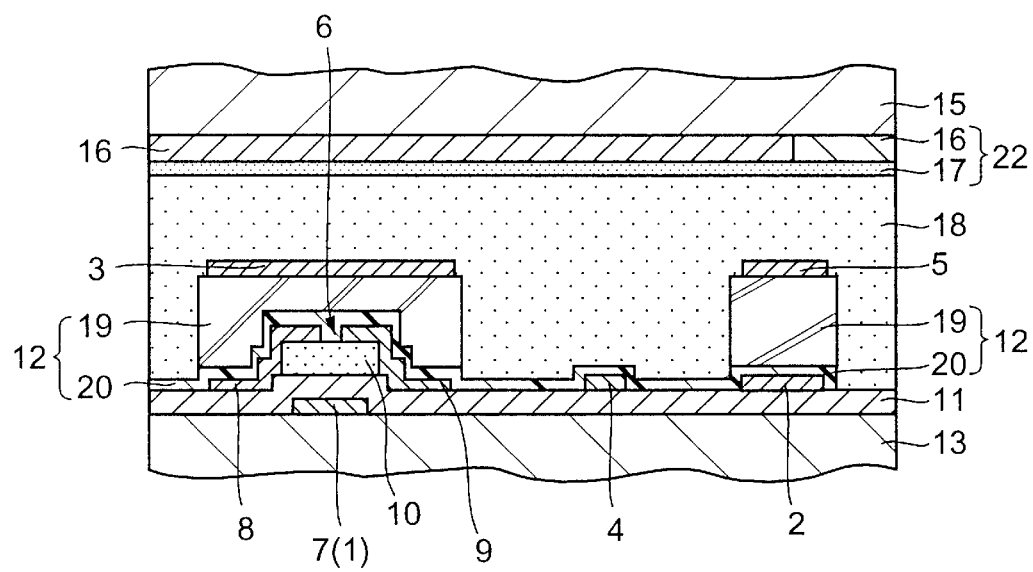
FIG. 18 is a cross section along a straight line XI to XI in FIG. 17.
Figure 19:
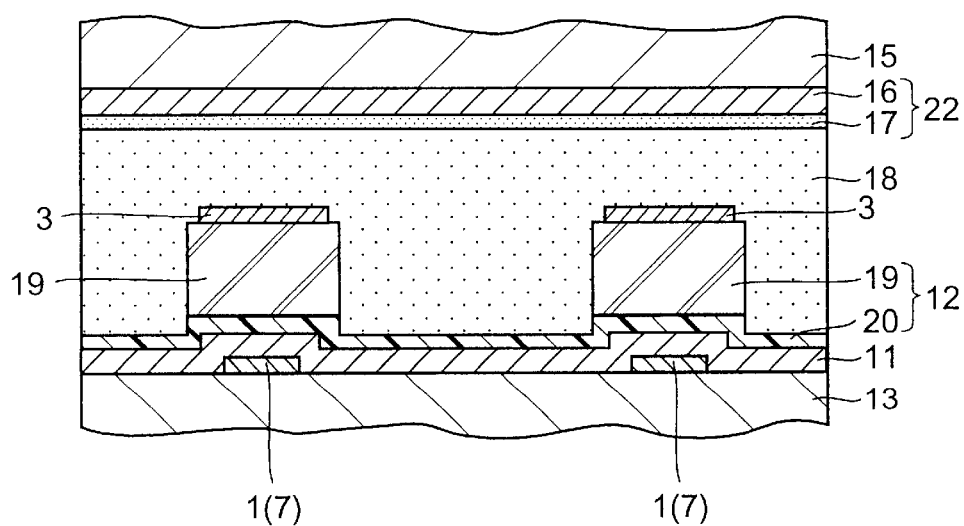
FIG. 19 is a cross section along a straight line XII to XII in FIG. 17.

FIGS. 16 to 19 illustrate part of an active-matrix-type LCD device, according to the third embodiment of the present invention. FIG. 16 illustrates part of the structure including adjacent TFTs, according to the third embodiment of the present invention, but not including common bus lines 3 and common electrodes 5 (which are illustrated in FIG. 17). In other words, FIG. 16 shows the structure before the common bus lines 3 and common electrodes 5 are fabricated. FIG. 17 illustrates the same part of the structure as that of FIG. 16, but further including both the elements 3 and 5. FIG. 18 is a cross section along a straight line XI to XI in FIG. 17, whereas FIG. 19 is a cross section along a straight line VII to VII. As shown in FIGS. 18 and 19, this display uses an inter-layer insulating film 12 made up of two films: a BCB film 19 and a SiN film 20. Wherein, part of the BCB film 19 corresponding to each pixel region P in the TFTs substrate 13 is selectively removed. The other arrangements are basically the same as those in the first embodiment.

As shown in FIGS. 18 and 19, in this display of the third embodiment, the thickness of only the part of the inter-layer insulating film 12 necessary for shutting out unnecessary electric fields radiated from the data bus lines 2, has remained large. In addition, a common electrode 5 is formed on each necessary part of the inter-layer insulating film 12. Otherwise, the thickness of the other part of the film 12 has remained small. With this arrangement, the inter-layer insulating film 12 helps to prevent an occurrence of a possible bad influence, caused by the said unnecessary electric fields, to the displaying voltage. As a result, an occurrence of a possible deterioration of the quality of displaying an image, caused by the polarization of the inter-layer insulating film 12, can be prevented. And much better quality of an image than that of the first embodiment can be displayed according to the third embodiment.

One method of manufacturing an LCD device of the third embodiment is to form the inter-layer insulating film 12. which is made up of two films: the BCB film 19 and SiN film 20, and then selectively remove part of the inter-layer insulating film 12 before forming the common electrodes 5. An alternative method, is to form the common electrodes 5 on the inter-layer insulating film 12 made up of two films: the BCB film 19 and SiN film 20, and then selectively remove part of the inter-layer insulating film 12. The other manufacturing steps are basically the same as those in the first embodiment.

In summary, according to the first through third embodiments, since the common electrodes 5 and/or the pixel electrodes 4 are formed so as to overlap with the gate bus lines 1 and/or the data bus lines 2, the electrostatic capacity regarding the above bus lines 1 and/or 2 may increase. However, due to the fact that the inter-layer insulating film 12 is made of an organic film with a low dielectric constant (i.e., a BCB film,) the possible increase in the electrostatic capacity is very small, and does not cause any problems.

(Fourth embodiment)

Figure 20:
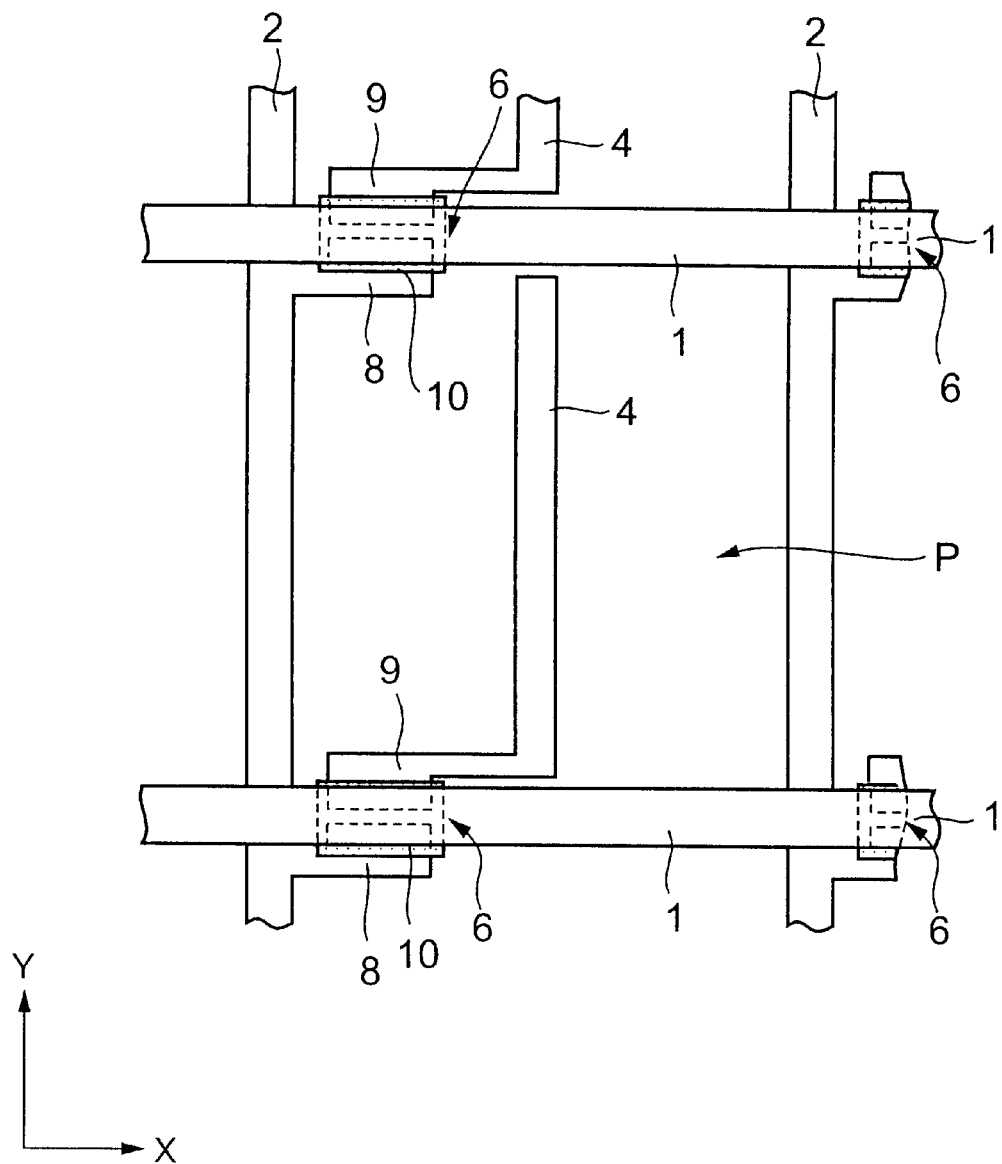
FIG. 20 illustrates the configuration of part of an active-matrix-type LCD device, according to a fourth embodiment of the present invention, before common bus lines 3 and common electrodes 5 are formed.
Figure 21:
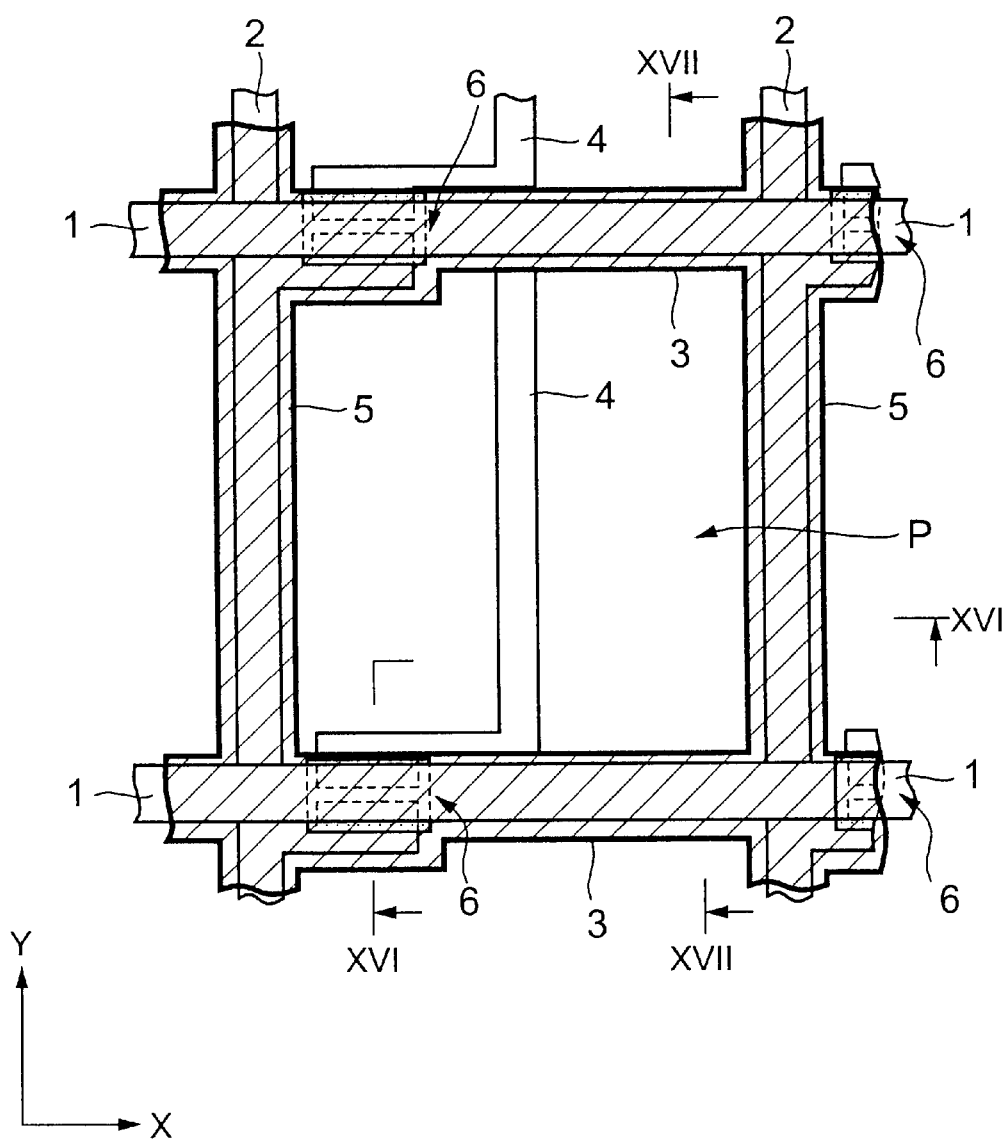
FIG. 21 illustrates the configuration of the same part as in FIG. 20, once the common bus lines 3 and common electrodes 5 are formed.
Figure 22:
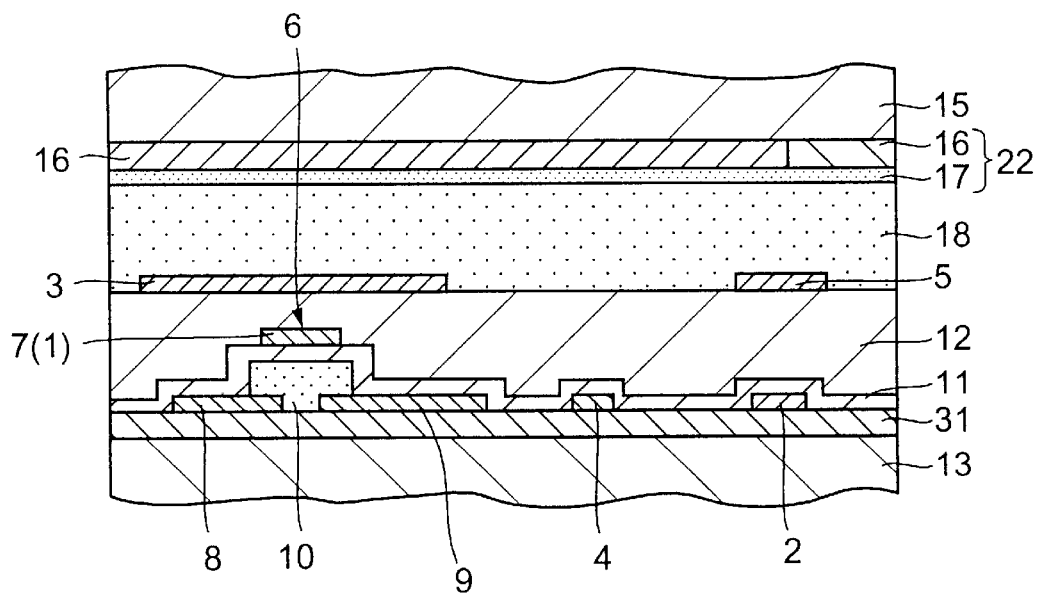
FIG. 22 is a cross section along a straight line XVI to XVI in FIG. 21.
Figure 23:
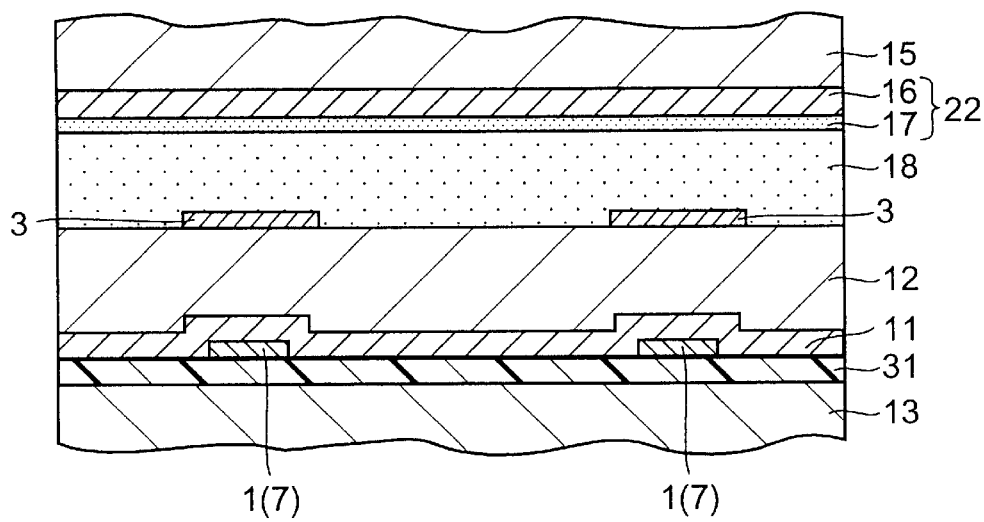
FIG. 23 is a cross section along a straight line XVII to XVII in FIG. 21.

FIGS. 20 to 23 illustrate part of an active-matrix-type LCD device, according to the fourth embodiment of the present invention. FIG. 20 illustrates part of the structure including adjacent TFTs, according to the fourth embodiment of the present invention, but not including common bus lines 3 and common electrodes 5 (which are illustrated in FIG. 21). In other words, FIG. 20 shows the structure before the common bus lines 3 and common electrodes 5 are fabricated. FIG. 21 illustrates the same part of the structure as that of FIG. 20, but further including both the elements 3 and 5. FIG. 22 is a cross section along a straight line XVI to XVI in FIG. 21, whereas FIG. 23 is a cross section along a straight line XVII to XVII. As shown in FIG. 22, this display has each TFT 6 with a so-called "top gate structure". In other words, the display uses amorphous silicon TFTs with a so-called "staggered structure", where a gate electrode 7 is formed above its corresponding source electrode 9 and drain electrode 8. The other arrangement of the fourth embodiment is basically the same as that of the first embodiment.

In FIG. 22, a silicon oxide layer 31 is formed on the surface of the TFTs substrate 13. Drain electrodes 8 and source electrodes 9 for the respective TFTs 6, data bus lines 2, and pixel electrodes 4 are all formed on top of the silicon oxide layer 31. An amorphous silicon layer 10 for each TFT 6 is formed on the silicon oxide layer 31, so as to bridge the gap between its corresponding drain electrode 8 and source electrode 9. The drain electrodes 8 and source electrodes 9, the data bus lines 2, the pixel electrodes 4, and the amorphous silicon layer 10 are all covered with a gate insulating film 11. A gate electrode 7 of each TFT 6 is formed on the gate insulating film 11, so as to overlap with its corresponding amorphous silicon layer 10.

According to the active-matrix-type LCD device of the fourth embodiment, it goes without saying that the identical results to those in the first embodiment can be obtained.

(Fifth embodiment)

Figure 24:
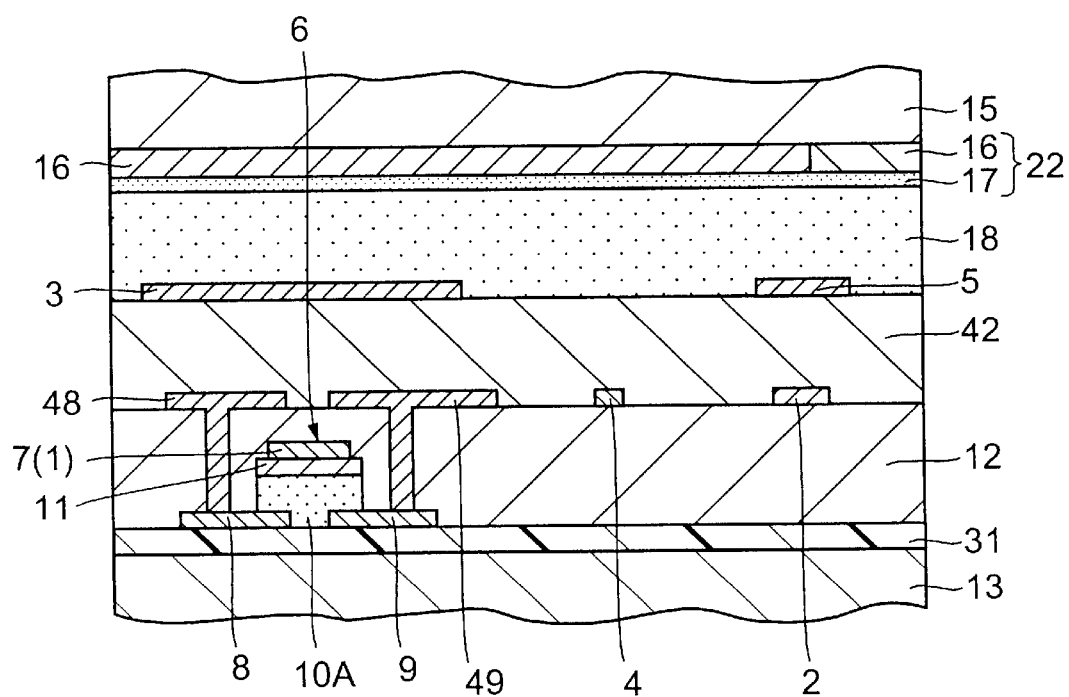
FIG. 24 is a cross section showing the configuration of part of an active-matrix-type LCD device, according to a fifth embodiment of the present invention.

FIG. 24 is a cross-section showing the configuration of an active-matrix-type LCD device, according to the fifth embodiment of the present invention. As is apparent from this figure, this display also has each TFT 6 with a so-called "top gate structure". In other words, the display uses polysilicon TFTs with a so-called "staggered structure", where a gate electrode 7 is formed above its corresponding source electrode 9 and drain electrode 8. The other arrangement of the fifth embodiment is basically the same as that of the first embodiment.

In FIG. 24, a silicon oxide layer 31 is formed on the surface of the TFTs substrate 13. Drain electrodes 8 and source electrodes 9 for the respective TFTs 6 are all formed on top of the silicon oxide layer 31. A polysilicon layer 10A for each TFT 6 is formed on the silicon oxide layer 31, so as to bridge the gap between its corresponding drain electrode 8 and source electrode 9. A gate electrode 7 for each TFT 6 is formed above the polysilicon layer 10A via a gate insulating film 11. The drain electrodes 8 and source electrodes 9, the polysilicon layers 10A and gate electrodes 7 of the respective TFTs 6 are all covered with an inter-layer insulating film 12.

Pixel electrodes 4 and data bus lines 2 are formed on the inter-layer insulating film 12. Each drain electrode 8 is connected to its corresponding data bus line 2 via an interconnecting layer 48, whereas each source electrode 9 is connected to its corresponding pixel electrode 4 via an interconnecting layer 49.

The pixel electrodes 4, the data bus lines 2, and the interconnecting layers 48 and 49 are all covered with an inter-layer insulating film 42, which is formed on the inter-layer insulating film 12. Common bus lines 3 and common electrodes 5 are both formed on the inter-layer insulating film 42.

According to the active-matrix-type LCD device of the fifth embodiment, it goes without saying that the identical results to those in the first embodiment can be obtained.

An LCD device and a manufacturing method of the same, according to the present invention, have been described in connection with certain preferred embodiments. It is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A liquid crystal display (LCD) device, comprising:

a first substrate;

a second substrate;

a liquid crystal layer sandwiched between said first substrate and said second substrate;

a plurality of data bus lines extending in a vertical direction formed on said first substrate;

a plurality of gate bus lines extending in a horizontal direction formed on said first substrate;

a plurality of thin film transistors (TFTs) each formed in the vicinity of each point of intersection of its corresponding gate bus lines and data bus lines;

a plurality of strip-shaped pixel electrodes each connected to a source electrode of said TFTs, extending parallel to said data bus lines;

an inter-layer insulating film formed on said pixel electrodes, said gate bus lines and said data bus lines;

a plurality of common electrodes extending in the vertical direction formed on top of said inter-layer insulating film;

a plurality of common bus lines extending in the horizontal direction formed on top of said inter-layer insulating film;

wherein said common electrodes cover said data bus lines and said common bus lines cover said gate bus lines.

2. The LCD device, according to claim 1, wherein said common electrodes further cover said TFTs.

3. The LCD device, according to claim 2, wherein a color filter layer is formed on said second substrate.

4. The LCD device, according to claim 1, wherein said inter-layer insulating film is removed in a pixel region where surrounded by said gate bus lines and said data bus lines.

5. The LCD device, according to claim 1, wherein said inter-layer insulating film is made up of a first insulating film and a second insulating film.

6. The LCD device, according to claim 5, wherein said first insulating film is a benzocyclobutene (BCB) film.

7. The LCD device, according to claim 5, wherein said second insulating film is a SiN film.

8. The LCD device, according to claim 5, wherein said inter-layer insulating film is made up of an inorganic film and an organic film with a low dielectric constant.

9. The LCD device, according to claim 8, wherein said low dielectric constant ranges from approximately 2.0 to 3.5.

10. The LCD device, according to claim 1, wherein each of said TFTs are an amorphous silicon TFT or a polysilicon TFT with a staggered structure or a reverse staggered structure.

* * * * *